US009361251B2

(12) United States Patent
Motai et al.

(10) Patent No.: US 9,361,251 B2
(45) Date of Patent: Jun. 7, 2016

(54) INTERRUPT SIGNAL ACCEPTING APPARATUS AND COMPUTER APPARATUS MANAGING OPERATIONS OF AT LEAST TWO OPERATING SYSTEMS

(75) Inventors: Hirotaka Motai, Tokyo (JP); Tomohisa Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 580 days.

(21) Appl. No.: 13/824,405

(22) PCT Filed: Oct. 22, 2010

(86) PCT No.: PCT/JP2010/068694
§ 371 (c)(1),
(2), (4) Date: Mar. 18, 2013

(87) PCT Pub. No.: WO2012/053095
PCT Pub. Date: Apr. 26, 2012

(65) Prior Publication Data
US 2013/0185469 A1 Jul. 18, 2013

(51) Int. Cl.
*G06F 13/26* (2006.01)
*G06F 13/24* (2006.01)
*G06F 9/48* (2006.01)

(52) U.S. Cl.
CPC .............. *G06F 13/24* (2013.01); *G06F 9/4831* (2013.01); *G06F 13/26* (2013.01)

(58) Field of Classification Search
USPC ................................................ 710/260–269
See application file for complete search history.

(56) References Cited

U.S. PATENT DOCUMENTS 6,715,016 B1 * 3/2004 Ohno ................... G06F 9/45533
710/260
6,785,893 B2 * 8/2004 Morris ................. G06F 11/3409
710/260

(Continued)

FOREIGN PATENT DOCUMENTS

JP 61 229129 10/1986
JP 5 40643 2/1993

(Continued)

OTHER PUBLICATIONS

Office Action issued Jun. 25, 2013 in Japanese Patent Application No. 2012-539540 (with partial English translation).

(Continued)

*Primary Examiner* — Raymond Phan
(74) *Attorney, Agent, or Firm* — Oblon, McClelland, Maier & Neustadt, L.L.P.

(57) ABSTRACT

An interrupt signal accepting apparatus manages two OSs, relates devices sharing the same interrupt number respectively with an OS caused to perform an interrupt processing and an interrupt priority unique to a device, and manages an interrupt number priority conversion table showing the relation between the interrupt number and the interrupt priority. Each device continuously outputs an interrupt request having the same interrupt number until the interrupt processing is completed. An interrupt controller converts the interrupt number into the interrupt priority in accordance with the interrupt number priority conversion table when there is an interrupt signal from the devices. An interrupt signal control section causes a running OS to perform the interrupt processing to change the interrupt priority in the interrupt number priority conversion table when the converted interrupt priority matches an interrupt priority related to the running OS, and stops the running OS and starts the other OS when the interrupt priorities do not match.

13 Claims, 16 Drawing Sheets

(56) References Cited

U.S. PATENT DOCUMENTS

| | | | | |
|---|---|---|---|---|
| 7,434,224 B2 * | 10/2008 | Lescouet | ............... | G06F 9/4843 710/260 |
| 7,783,810 B2 * | 8/2010 | Kyusojin | ................ | G06F 13/24 709/250 |
| 7,793,025 B2 * | 9/2010 | Ehrlich | ................... | G06F 13/26 710/261 |
| 8,417,862 B2 * | 4/2013 | Talamacki | .......... | G06F 9/45558 710/263 |
| 8,612,992 B2 * | 12/2013 | Lescouet | ............... | G06F 9/4555 710/266 |
| 2011/0179413 A1 * | 7/2011 | Subramanian | ...... | G06F 9/45558 718/1 |

FOREIGN PATENT DOCUMENTS

| JP | 11 149385 | 6/1999 |
|---|---|---|
| JP | 2000 330806 | 11/2000 |
| JP | 2001 229038 | 8/2001 |
| JP | 2007 35066 | 2/2007 |
| JP | 2007 164421 | 6/2007 |
| JP | 2009 176139 | 8/2009 |

OTHER PUBLICATIONS

"Open Design No. 7:PCI Bus Details and Steps toward Application," CQ Publishing Co., Ltd., Total 5 Pages, (Mar. 10, 1995).
International Search Report Issued Jan. 25, 2011 in PCT/JP10/68694 Filed Oct. 22, 2010.
Combined Office Action issued Aug. 28, 2015 in Chinese Patent Application No. 201080069758.0 (with partial English translation and English translation of Category of Cited Documents).

* cited by examiner

Fig. 4

| INTERRUPT NUMBER | DEVICE NAME |
|---|---|
| 16 | DEVICE A |
| 16 | DEVICE B (1) |
| 21 | DEVICE B (2) |
| 22 | DEVICE B (3) |
| : | : |

| INTERRUPT NUMBER | INTERRUPT PRIORITY |
|---|---|
| 16 | 20 |
| 21 | 101 |
| 22 | 101 |
| : | : |

| INTERRUPT PRIORITY | DEVICE NAME | OS NAME |
|---|---|---|
| 20 | DEVICE A | OS-A |
| 100 | DEVICE B(1) | OS-B |
| 101 | DEVICE B(2) | OS-B |
| 101 | DEVICE B(3) | OS-B |
| ⋮ | ⋮ | ⋮ |

Fig. 7

| INTERRUPT NUMBER | CANDIDATE OS | OS IN USE |
|---|---|---|
| 16 | OS-A, OS-B | OS-A |
| 21 | OS-B | OS-B |
| 22 | OS-B | OS-B |
| ⋮ | ⋮ | ⋮ |

Fig. 14

| INTERRUPT NUMBER | PRIORITY CANDIDATE | REPRODUCED PRIORITY |
|---|---|---|
| 16 | 20, 100 | |
| 21 | 101 | |
| 22 | 101 | |
| ⋮ | ⋮ | |

199

INTERRUPT SIGNAL ACCEPTING APPARATUS AND COMPUTER APPARATUS MANAGING OPERATIONS OF AT LEAST TWO OPERATING SYSTEMS

TECHNICAL FIELD

The present invention relates to an interrupt control technique in a multi-operating system environment.

BACKGROUND ART

Generally on a computer system, there is a single operating system (OS) running to manage computer resources such as a computer processor, a main storage unit (hereinafter, referred to simply as a main memory), a secondary storage unit, and a device of a computer, and schedule the computer so that the computer can operate efficiently.

OSs possess their own unique characteristics, including multi-functional OSs with a lot of properties such as Windows (registered trademark) and Linux (registered trademark), and real-time OSs having functions specializing in real-time processing.

Among others, a multi-operating system (multi-OS) is known to enable a plurality of OSs like those described above to operate on a single computer configured to have a single or a plurality of processors.

A multi-OS is described in Patent Literature 1, Patent Literature 2 and Patent Literature 3, for example.

Referring further to a multi-OS, with an interrupt generated via a peripheral device such as a mouse or a keyboard, an OS accepting an interrupt request is specified according to the interrupt number, and the interrupt number of the generated interrupt is determined, thereby switching OSs (see e.g., the technology disclosed in Patent Literature 1).

With an existing computer, peripheral devices are added.

However, there is a limit to the number of interrupt signals on the computer, and therefore the addition is not easy.

Accordingly, a single interrupt signal line is increasingly shared by a plurality of peripheral devices, like a group of peripheral devices connected to a peripheral component interconnect (PCI) bus.

Alternatively, interrupts from a plurality of peripheral devices are collected by a smaller number of interrupt management devices than the peripheral devices to share an interrupt signal line.

A PCI interrupt signal line (interrupt signal) is disclosed in Non-Patent Literature 1, for example.

CITATION LIST

Patent Literature

Patent Literature 1: JP H11-149385 A
Patent Literature 2: JP 2001-229038 A
Patent Literature 3: JP 2009-176139 A

Non-Patent Literature

Non-Patent Literature 1: "Open Design No. 7: PCI Bus Details and Steps toward Application", Mar. 10, 1995, p. 20, Toshio Kaneko as Editor, Kazuo Kobe as Publisher, CQ Publishing Co. Ltd

SUMMARY OF INVENTION

Technical Problem

Conventionally, an OS to accept an interrupt signal is specified according to the interrupt number, and therefore all the peripheral devices interrupting with the same interrupt number (shared interrupt number) are to be controlled by the same OS.

This poses a problem of failing to assign an adequate OS required for a specific device.

To solve this problem, it is required to have a device identification register to identify a device generating an interrupt, like the technique disclosed in Patent Literature 2, or confirm the cause of an interrupt at a related peripheral device, apart from OS processing.

A main objective of this invention is to solve a problem such as that described above, that is, to assign interrupts from a plurality of peripheral devices interrupting with a shared interrupt number respectively to adequate OSs among a plurality of OSs, with no device identification register and no confirmation of the cause of interrupts at related peripheral devices, apart from OS processing.

Solution to Problem

An interrupt signal accepting apparatus according to this invention manages the operations of at least two operating systems (OSs) and accepts interrupt signals from a plurality of devices, wherein an interrupt number notified by an interrupt signal and an OS caused to process the interrupt signal as a specified OS are specified to each of the plurality of devices. The interrupt signal accepting apparatus includes:

an OS unique value information storing section that stores OS unique value information to relate each of at least two number sharing devices which share the same interrupt number, to the specified OS of each number sharing device, a unique value which is unique to each number sharing device, and a shared interrupt number which is shared by the at least two number sharing devices;

a conversion value information storing section that stores conversion value information to specify a unique value selected from among at least two unique values related to the shared interrupt number in the OS unique value information as a conversion value of the shared interrupt number, for each shared interrupt number; and an interrupt signal control section that:
when the interrupt signal notifying of the shared interrupt number is outputted while one of the OSs is running as a running OS,
causes the running OS to execute a processing for the interrupt signal if the conversion value obtained by converting the shared interrupt number notified by the interrupt signal in accordance with the conversion value information is the same as the unique value related to the running OS, and
causes the running OS to stop, and an OS other than the running OS as a new running OS to start if the conversion value obtained by converting the shared interrupt number notified by the interrupt signal in accordance with the conversion value information is the same as the unique value related to the OS other than the running OS.

Advantageous Effects of Invention

According to this invention, a number sharing device, an OS, and a unique value are related, and if a conversion value obtained by converting an interrupt number and the unique value related to a running OS match, the running OS is caused to process an interrupt signal, and when the conversion value and the unique value do not match, the running OS is switched.

By causing a device to continuously output the same interrupt number until a specified OS processes an interrupt signal, and switching the conversion value to another unique value when the conversion value obtained by converting the interrupt number and the unique value related to the running OS match, if a plurality of devices share the same interrupt number, the interrupt signal can always be processed by the specified OS which corresponds to the output source of the interrupt signal, with no confirmation of the cause of an interrupt.

BRIEF DESCRIPTION OF DRAWINGS

FIG. 4 shows an example of a device interrupt number connection table according to the first embodiment.

FIG. 5 shows an example of an interrupt number priority conversion table according to the first embodiment.

FIG. 6 shows an example of a device priority management table according to the first embodiment.

FIG. 7 shows an example of an interrupt use management table according to the first embodiment.

FIG. 14 shows an example of an interrupt reproduction management table according to the second embodiment.

DESCRIPTION OF EMBODIMENTS

Embodiment 1

In the description given below, what is described as a "section", a "means" or a "processing" may be a "circuit" or "equipment", or alternatively a "step" or a "procedure".

That is, a "section", a "means" or a "processing" described below may be implemented by software, firmware, hardware or any combination thereof.

Figure 1:
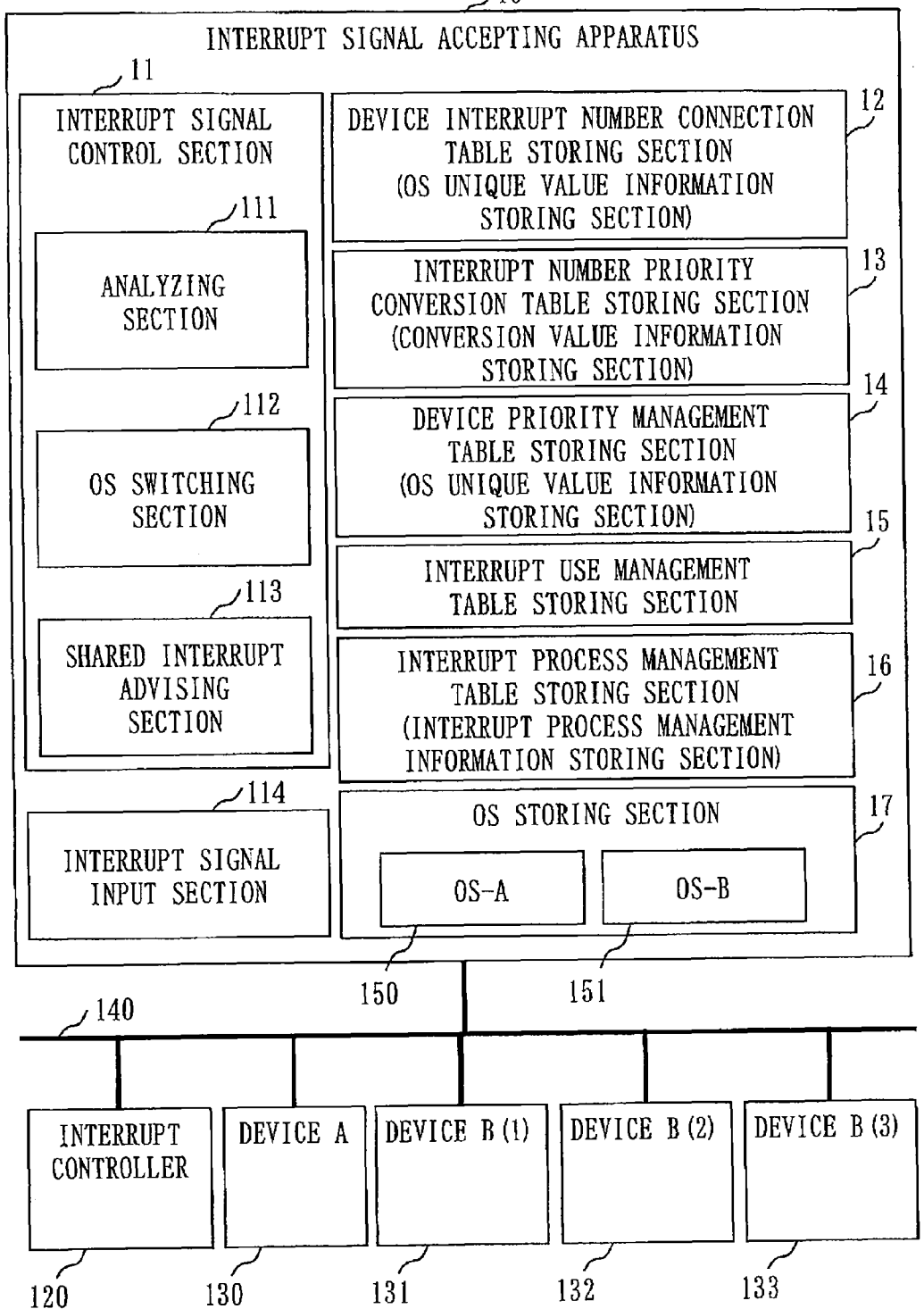
FIG. 1 shows a functional block of an interrupt signal accepting apparatus according to a first embodiment.

FIG. 1 shows a functional block of an interrupt signal accepting apparatus 10 included in a multi-OS computer apparatus.

The interrupt signal accepting apparatus 10 manages the operations of two OSs, i.e., an OS-A 150 and an OS-B 151.

Figure 2:
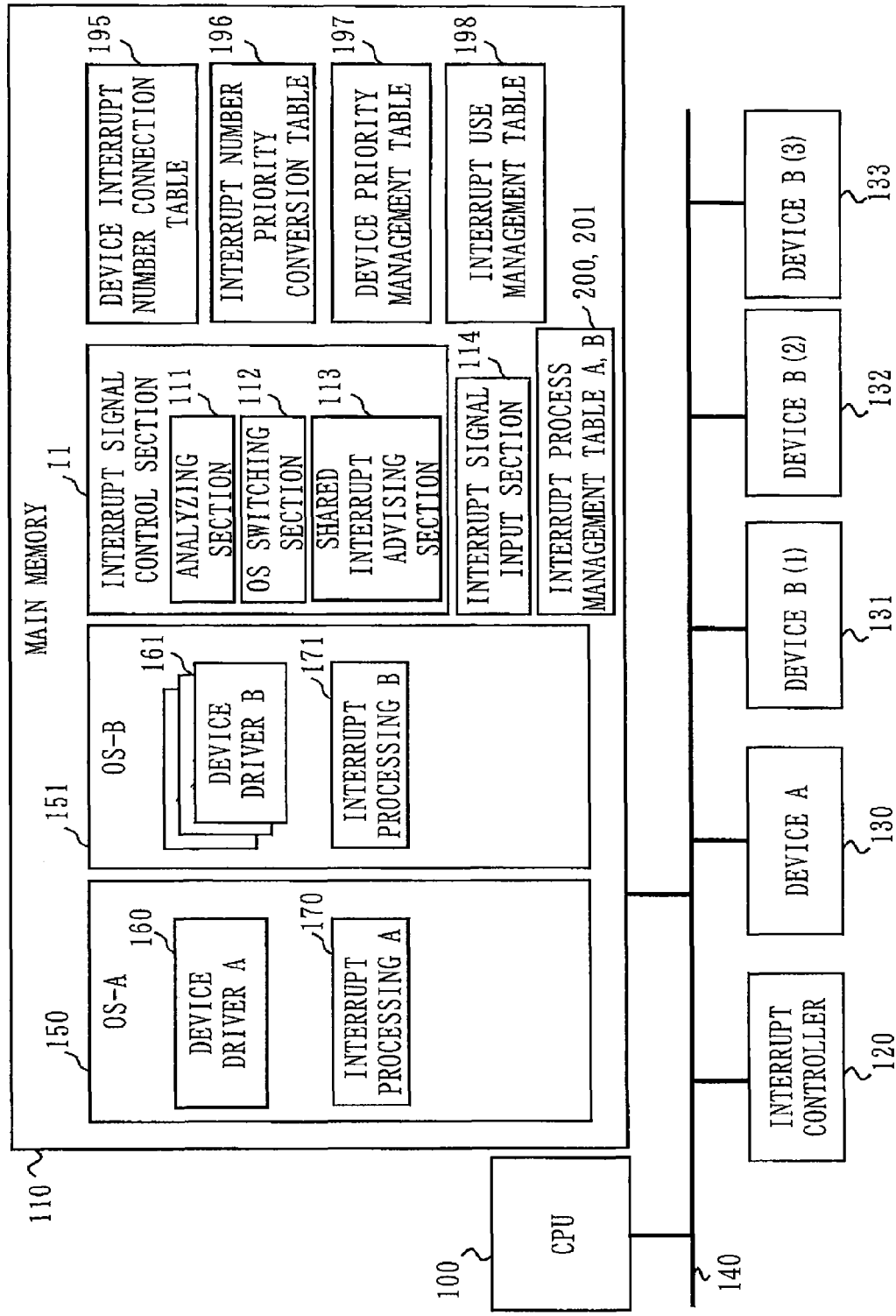
FIG. 2 shows a hardware configuration example of the interrupt signal accepting apparatus according to the first embodiment.

Specifically, the interrupt signal accepting apparatus 10 is implemented by a central processing unit (CPU) 100 and a main memory 110 as shown in FIG. 2

The internal configuration of the interrupt signal accepting apparatus 10 will be described later in detail.

The interrupt signal accepting apparatus 10 is connected to an interrupt controller 120 and a plurality of devices 130 to 133 via a bus 140, and accepts interrupt signals from the devices 130 to 133.

The device 130 to 133 is a keyboard, a mouse, a network interface, a printer interface, a universal serial bus (USB) controller or the like.

The device 130 to 133 outputs an interrupt signal.

Each of the devices 130 to 133 has an interrupt number, notified by an interrupt signal, assigned to.

In this embodiment, as shown in a device interrupt number connection table in FIG. 4, the interrupt number of a device A 130 is 16, the interrupt number of a device B(1) 131 is 16, the interrupt number of a device B(2) 132 is 21, and the interrupt number of a device B(3) 133 is 22, for example.

Each device outputs the interrupt signal notifying of the value of the interrupt number assigned to each device.

The interrupt number of the device A 130 and the interrupt number of the device B(1) 131 are both 16 in common.

Thus, the devices that share the interrupt number are called number sharing devices.

The interrupt number that is shared by the number sharing devices is called a shared interrupt number.

The devices 130 to 133 each have an OS specified to, which processes the interrupt signal.

In this embodiment, for the device A 130 the OS-A 150 processes the interrupt signal, and for the devices 131 to 133 the OS-B 151 processes the interrupt signals.

Accordingly, the interrupt number outputted from the device A 130 as the interrupt signal and the interrupt number outputted from the device B(1) 131 as the interrupt signal are the same, but the interrupt signals need to be processed by different OSs.

The OS that is specified to each device is called a specified OS.

The specified OS of the device A 130 is the OS-A 150, and the specified OS of the devices 131 to 133 is the OS-B 151.

Further, in this embodiment, the device 130 to 133 continuously outputs the same interrupt number as the interrupt signal until the interrupt signal is processed by the specified OS (until the interrupt signal is accepted by the specified OS).

The interrupt controller 120 receives the interrupt signals from the devices 130 to 133 via the bus 140.

As described earlier, the device 130 to 133 outputs the interrupt signal notifying of the interrupt number, and the interrupt controller 120 converts the interrupt number into an interrupt priority and advises the CPU 100 of the interrupt priority.

More specifically, the interrupt controller 120 outputs a signal notifying of the interrupt priority as the interrupt signal to the CPU 100.

The interrupt controller 120 converts the interrupt number into the interrupt priority with reference to an interrupt number priority conversion table shown in FIG. 5, for example.

Referring to FIG. 5, interrupt priority 20 is shown for interrupt number 16 which is shared by the device A 130 and the device B(1) 131. As will be described later, however, interrupt priority 100 is also available for interrupt priority 16, other than interrupt number 20.

Interrupt priority 20 and interrupt priority 100 are alternately set for interrupt number 16 (interrupt priority is rewritten) under the CPU 100 control.

The interrupt priority is a conversion value of the interrupt number. The interrupt number priority conversion table shown in FIG. 5 is an example of conversion value information.

As described earlier, the device 130 to 133 repeatedly generates the interrupt signal until an OS processing is performed with the interrupt signal, and the interrupt controller 120 repeatedly outputs a corresponding interrupt priority to the interrupt signal accepting apparatus 10 each time receiving the interrupt signal from the device 130 to 133.

Although there is only one of the interrupt controller 120 shown in FIG. 1, two or more of them may be provided, instead.

Now, a description is given of the interrupt signal accepting apparatus 10 in detail with reference to FIG. 1 and FIG. 2.

When receiving the interrupt signal notifying of the interrupt priority outputted from the interrupt controller 120, an interrupt signal control section 11 controls the running OS to process the interrupt signal, controls the rewriting of the value of the interrupt priority in the interrupt number priority conversion table in FIG. 5, and controls the switching of the running OS, based on the value of the interrupt priority and the running OS (OS-A 150 or OS-B 151).

An interrupt signal input section 114 receives the interrupt signal from the interrupt controller 120.

The interrupt signal control section 11 and the interrupt signal input section 114 are programs which are loaded to the main memory 110 from a secondary memory as shown in FIG. 2, and executed by the CPU 100.

A device interrupt number connection table storing section 12 is a means of storing a device interrupt number connection table 195, and more particularly a part of the memory area of the main memory 110 as shown in FIG. 2.

The device interrupt number connection table 195 is information shown in FIG. 4, showing the interrupt number assigned to each device.

It should be noted that the device interrupt number connection table 195, along with a device priority management table 197 which will be discussed later, corresponds to OS unique value information. The device interrupt number connection table storing section 12, along with a device priority management table storing section 14, corresponds to an OS unique value information storing section.

An interrupt number priority conversion table storing section 13 is a means of storing an interrupt number priority conversion table 196, and more particularly a part of the memory area of the main memory 110 as shown in FIG. 2.

The interrupt number priority conversion table 196 is information shown in FIG. 5, which is referred to by the interrupt controller 120 converting the interrupt number into the interrupt priority as described earlier.

The interrupt number priority conversion table 196 corresponds to conversion value information, and the interrupt number priority conversion table storing section 13 corresponds to a conversion value information storing section.

The device priority management table storing section 14 is a means of storing the device priority management table 197, and more particularly a part of the memory area of the main memory 110 as shown in FIG. 2.

The device priority management table 197 is information shown in FIG. 6, showing the interrupt priority, the device 130 to 133, and the name of an OS to process the interrupt signal.

The device priority management table 197 may be separated for each device used by each OS (e.g., the table of the device A for the OS-A 150, tables of the devices B(1) to B(3) for the OS-B 151).

Referring to FIG. 6, the device A 130 is assigned 20 as the interrupt priority, and the device B(1) 131 is assigned 100 as the interrupt priority.

As shown in the device interrupt number connection table 195 in FIG. 4, although the device A 130 and the device B(1) 131 of the number sharing devices are assigned interrupt number 16 in common, the assigned interrupt priorities are different between the device A 130 and the device B(1) 131.

More specifically, interrupt priority 20 assigned to device A 130 is a value unique to the device A 130, which is an example of a unique value.

Likewise, interrupt priority 100 assigned to the device B(1) 131 is a value unique to the device B(1) 131, which is an example of the unique value.

When the device interrupt number connection table 195 in FIG. 4 and the device priority management table 197 in FIG. 6 are combined, the number sharing devices (device A 130, device B(1) 131) each are related to the specified OS of each number sharing device (OS-A 150, OS-B 151), the unique value (interrupt priority 20, interrupt priority 100) of each number sharing device, and the shared interrupt number (interrupt number 16) shared by the number sharing devices.

The device interrupt number connection table 195 in FIG. 4 and the device priority management table 197 in FIG. 6 possess the characteristics described above, which correspond to OS unique value information.

The device priority management table storing section 14, along with the device interrupt number connection table storing section 12, corresponds to an OS unique value information storing section.

It should be noted that the device interrupt number connection table 195 and the device priority management table 197 may be incorporated into a single table.

An interrupt use management table storing section 15 is a means of storing an interrupt use management table 198, and more particularly a part of the memory area of the main memory 110 as shown in FIG. 2.

The interrupt use management table 198 is information shown in FIG. 7, showing the interrupt number, a candidate OS using the interrupt number, and a use OS currently using the interrupt number.

An interrupt process management table storing section 16 is a means of storing an interrupt process management table A 200 and an interrupt process management table B 201, and more particularly a part of the memory area of the main memory 110 as shown in FIG. 2.

Figure 3:
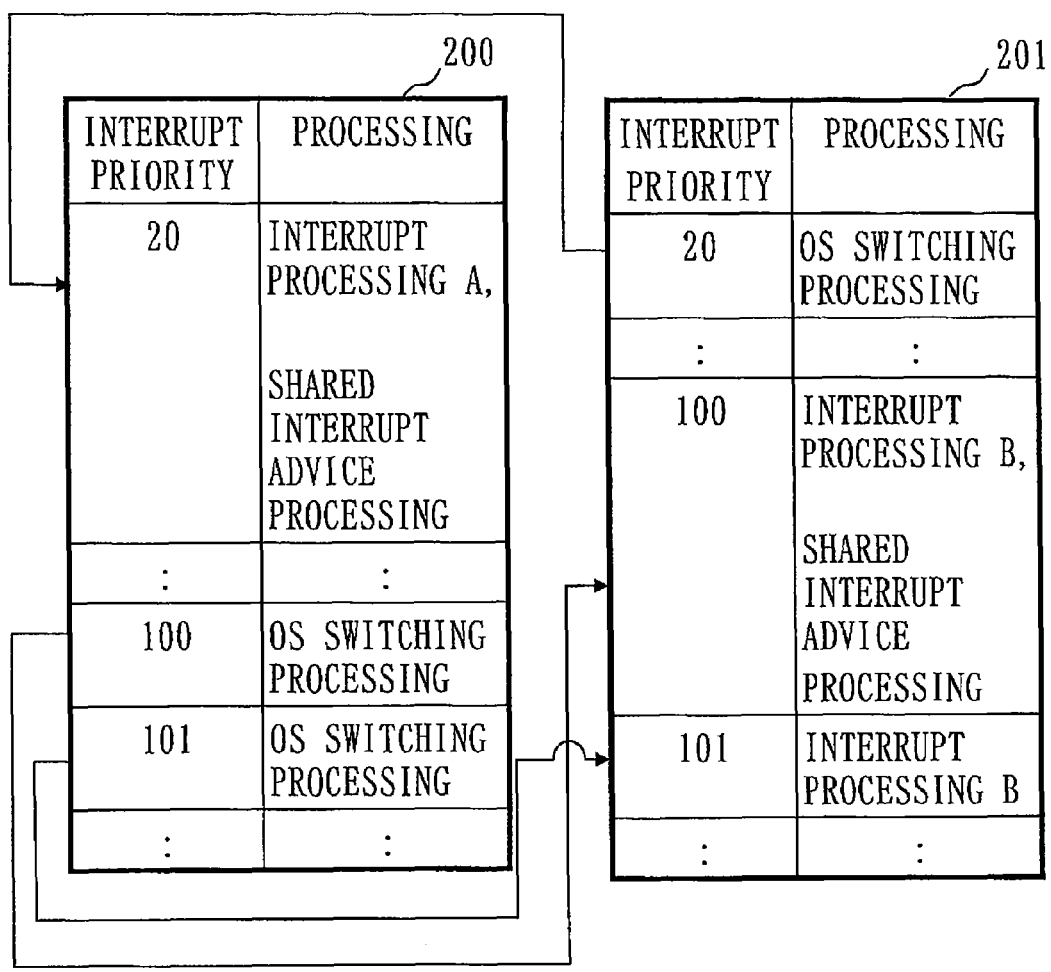
FIG. 3 shows an example of an interrupt process management table according to the first embodiment.

The interrupt process management table A 200 and the interrupt process management table B 201 are information shown in FIG. 3, at least one of which is provided for each OS.

The interrupt process management table A 200 is a table for the OS-A 150, and the interrupt process management table B 201 is a table for the OS-B 151.

The interrupt process management table A 200 is referred to when there is an input of the interrupt signal while the OS-A 150 is running. The interrupt process management table B 201 is referred to when there is an input of the interrupt signal while the OS-B 151 is running.

An OS storing section 17 is a means of storing the OS-A 150 and the OS-B 151, and more particularly a part of the memory area of the main memory 110 as shown in FIG. 2.

The OS-A 150 and the OS-B 151 may be the same copies of an OS.

The OS-A 150 and the OS-B 151 each include the device driver A 160, the device driver B 161, an interrupt processing A 170, and an interrupt processing B 171.

Two or more of the interrupt processing A 170 and the interrupt processing B 171 may be provided in each OS.

The OS-A 150 and the OS-B 151 each include functions included in a regular OS, which are not shown.

A program code read into the main memory 110 may also be a part of the OS-A 150 and a part of the OS-B 151.

In the interrupt signal control section 11, an analyzing section 111 receives the interrupt signal from the interrupt controller 120 via the interrupt signal input section 114, and determines a processing for the interrupt signal in accordance with the interrupt priority notified by the interrupt signal, with reference to the interrupt process management table (FIG. 3) corresponding to the running OS.

For example, when the interrupt signal is inputted while the OS-A 150 is running, and the interrupt priority notified by the inputted interrupt signal is 20, then the OS-A 150 is caused to perform the interrupt processing A 170 for the interrupt signal with reference to a record corresponding to interrupt priority 20 in the interrupt process management table A 200. Then, a shared interrupt advising section 113 is caused to perform a processing (shared interrupt advice processing) to change the value of the interrupt priority corresponding to interrupt number 16 in the device interrupt number connection table 195 in FIGS. 5 to 100 from 20.

When the interrupt signal is inputted while the OS-A 150 is running, and the interrupt priority notified by the inputted interrupt signal is 100, then an OS switching section 12 is caused to perform a processing (OS switching processing) to switch the running OS to the OS-B 151 from the OS-A 150 with reference to a record corresponding to interrupt priority 100 in the interrupt process management table A 200.

When the interrupt signal is inputted while the OS-B 151 is running, and the interrupt priority notified by the inputted interrupt signal is 20, the OS switching section 112 is caused to perform a processing (OS switching processing) to switch the running OS to the OS-A 150 from the OS-B 151 with reference to a record corresponding to interrupt priority 20 in the interrupt process management table B 201.

When the interrupt signal is inputted while the OS-B 151 is running, and the interrupt priority notified by the inputted interrupt signal is 100, the OS-B 151 is caused to perform the interrupt processing B 171 for the interrupt signal with reference to a record corresponding to interrupt priority 100 in the interrupt process management table B 201. Then, the shared interrupt advising section 113 is caused to perform a processing (shared interrupt advice processing) to change the value of the interrupt priority corresponding to interrupt number 16 in the device interrupt number connection table 195 in FIGS. 5 to 20 from 100.

An OS switching section 191 stores the context of the running OS (contents of various registers in the CPU 100), and writes back the context of the OS to be switched to.

The interrupt process management table is also switched.

The shared interrupt advising section 113 rewrites the interrupt priority in the interrupt number priority conversion table 196 in FIG. 5.

The interrupt process management table A 200 and the interrupt process management table B 201, corresponding to the OS-A 150 and the OS-B 151, each define the interrupt processing and the shared interrupt advice processing (conversion value information update processing) for the interrupt priority (unique value) related to each OS in the device priority management table 197, as described earlier.

When the interrupt signal notifying of the shared interrupt number is outputted, the analyzing section 111 retrieves the interrupt process management table for the running OS from the interrupt process management table storing section 16, and extracts from the interrupt process management table for the running OS the same interrupt priority (unique value) as the interrupt priority (conversion value) obtained by converting the shared interrupt number of the interrupt signal in the interrupt controller 120 in accordance with the interrupt number priority conversion table 196.

Then, when the interrupt processing and the shared interrupt advice processing are defined for the extracted interrupt priority, the analyzing section 111 causes the running OS to execute the interrupt processing for the interrupt signal if the output source of the interrupt signal is a number sharing device whose specified OS is the running OS.

Further, as the shared interrupt advice processing, the analyzing section 111 causes the shared interrupt advising section 113 to select other interrupt priority related to the shared interrupt number in the device priority management table 197 and update the interrupt number priority conversion table 196 so that the selected interrupt priority is specified.

Further, when the OS switching processing is defined for the extracted interrupt priority from the interrupt process management table, the analyzing section 111 causes the OS switching section 112 to stop the running OS and start an OS other than the running OS as a new running OS.

When the interrupt priority that is inputted while the OS-A 150 is running is 20, the interrupt processing A is selected.

In this circumstance, the interrupt processing A 170 inquires the device A 130 if the device A 130 is the output source of the interrupt signal. If the output source of the interrupt signal is the device A 130, then the device driver A 160 or the like executes the processing for the interrupt signal.

Subsequently, through the shared interrupt advice processing, the interrupt priority corresponding to interrupt number 16 shown in the interrupt number priority conversion table 196 in FIG. 5 is changed to 100.

In this case, the interrupt signal is processed by the OS-A 150 as the specified OS, and therefore the device A 130 does not advise of the interrupt signal repeatedly.

If the requester of the interrupt signal is the device B(1) 131, then the interrupt signal from the device B(l) 131 is not processed through the interrupt processing A 170. Subsequently, the interrupt priority shown in the interrupt number priority conversion table 196 in FIG. 5 is changed to 100 through the shared interrupt advice processing.

In this case, the interrupt signal is not processed yet by the OS-B 151 as the specified OS, and accordingly the device B(1) 131 advises of the interrupt signal repeatedly.

The interrupt signal is assigned interrupt priority 100 by the interrupt controller 120, and the analyzing section 111 receives the interrupt signal corresponding to interrupt priority 100.

If the current running OS is the OS-B 151, the interrupt processing B 171 is performed.

In this case, the interrupt processing B 171 inquires the device B(1) 131 if the device B(1) 131 is the output source of the interrupt signal. If the output source of the interrupt signal is the derive B(1) 131, then the device driver B 161 or the like executes the processing for the interrupt signal.

Subsequently, the interrupt priority shown in the interrupt number priority conversion table 196 in FIG. 5 is changed to 20 through the shared interrupt advice processing.

In this case, the interrupt signal is processed by the OS-B 151 as the specified OS, and accordingly the device B(1) 131 does not advise of the interrupt signal repeatedly.

If the current running OS is the OS-A 150, the running OS is switched to the OS-B 151 by the OS switching processing.

The interrupt signal is not processed yet by the OS-B 151 as the specified OS, and accordingly the device B(1) 131 advises of the interrupt signal repeatedly.

The interrupt signal is assigned interrupt priority 100 by the interrupt controller 120, and the analyzing section 111 receives the interrupt signal corresponding to interrupt priority 100.

The current running OS is the OS-B 151, and therefore the interrupt signal from the device B(1) 131 is processed appropriately by the OS-B 151 through the interrupt processing B 171.

Subsequently, the interrupt priority shown in the interrupt number priority conversion table 196 in FIG. 5 is changed to 20 through the shared interrupt advice processing.

In this case, the interrupt signal is processed by the OS-B 151 as the specified OS, and accordingly the device B(1) 131 does not advise of the interrupt signal repeatedly.

Figure 8:
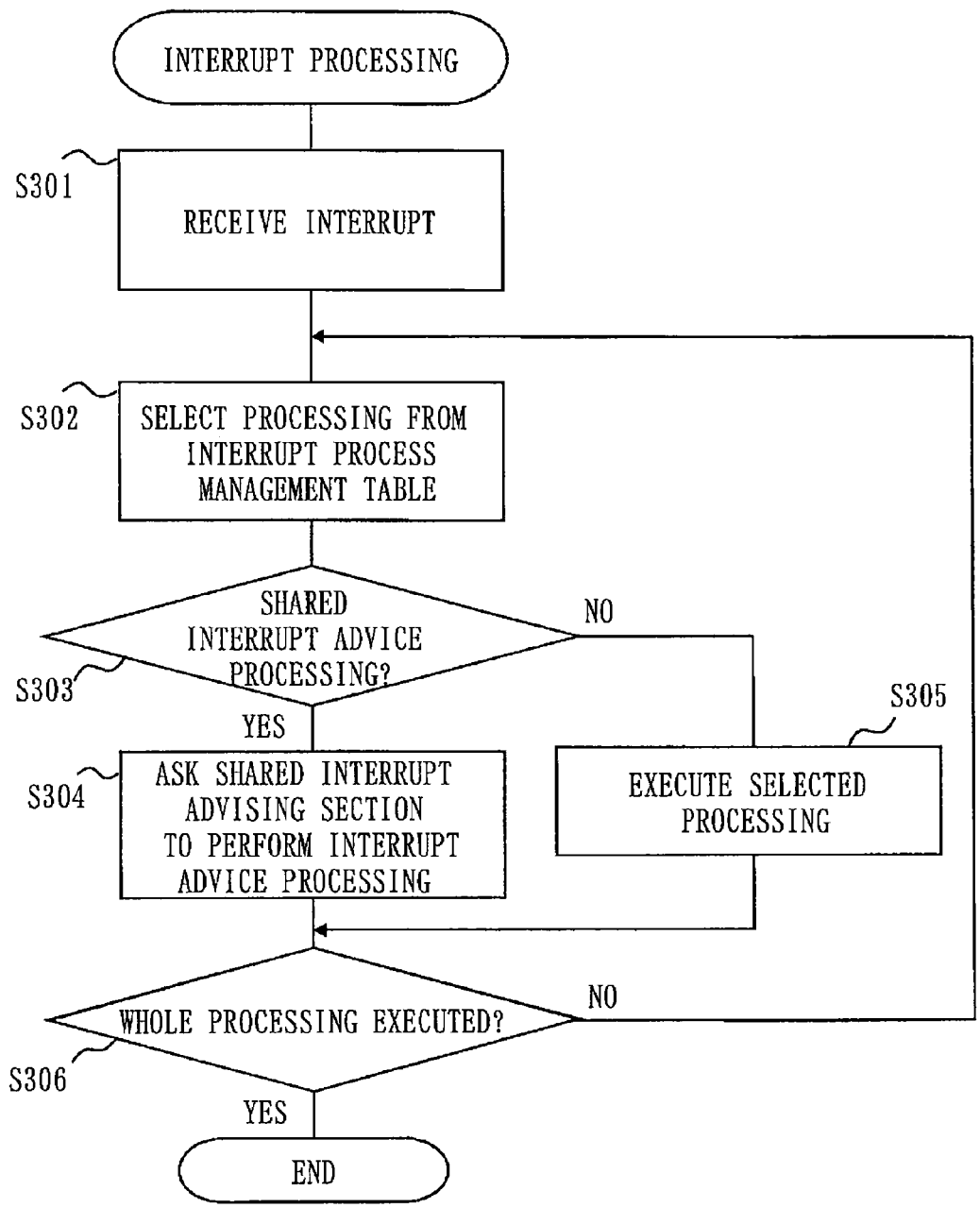
FIG. 8 is a flow chart illustrating a processing flow upon generation of an interrupt.

Now, a description is given with reference to FIG. 8 of an operation performed when the interrupt signal is inputted to the CPU 100 via the bus 140.

When the interrupt signal is outputted from a device, in the CPU 100, the interrupt signal input section 114 receives the interrupt signal from the interrupt controller 120 via the bus 140, in S301.

Then, in S302, the analyzing section 111 extracts a record corresponding to the interrupt priority from the currently set interrupt process management table A 200, B 201, and selects a processing that remains unprocessed from among those in the extracted record.

It does not matter which processing is to be selected prior to others.

Here, a description is given, assuming that the interrupt process management table A 200 is set (OS-A 150 as the running OS), and interrupt priority 20 is inputted.

The analyzing section 111 selects the interrupt processing A 170 from the record corresponding to interrupt priority 20 in the interrupt process management table A 200.

Then, in S303, the analyzing section 111 determines whether the selected processing is the shared interrupt advice processing.

If it is the shared interrupt advice processing, then the process proceeds to S304, and if not, the process proceeds to S305.

In this example, the selected processing is the interrupt processing A 170, and therefore the process proceeds to S305.

Then, in S305, the analyzing section 111 executes the selected processing.

In this example, the interrupt processing A 170 is executed.

The interrupt processing A 170 accesses the device A 130 to confirm if the device A 130 is the cause of the interrupt.

If the device A 130 is the cause of the interrupt, then the interrupt processing A 170 requests the device driver A 160 or the OS-A 150 to execute the processing for the interrupt signal from the device A 130.

If the device A 130 is not the cause of the interrupt, then the interrupt processing A advises the OS-A 150 that the device A 130 is not the cause of the interrupt, if necessary.

Then, in S306, the analyzing section 111 determines whether there are any processing remaining unexecuted among those corresponding to the interrupt priority in the currently set interrupt process management table.

If no processing remains unexecuted, then the interrupt processing is terminated.

If there is a processing remaining unexecuted, the process proceeds to S302.

In this example, there is an unexecuted processing remained, and therefore the process proceeds to S302.

Then, in S302, the analyzing section 111 selects a processing unexecuted.

In this example, the analyzing section 111 selects the shared interrupt advice processing from among unexecuted processings in the currently set interrupt process management table A 200.

Then, in S303, the analyzing section 111 determines whether the selected processing is the shared interrupt advice processing.

In this example, it is the shared interrupt advice processing, and accordingly, the process proceeds to S304.

Then, in S304, the analyzing section 111 requests the shared interrupt advising section 113 for the shared interrupt advice processing.

More specifically, the interrupt priority in process is advised.

In this example, the analyzing section 111 advises the shared interrupt advising section 113 of interrupt priority 20 and requests for the shared interrupt advice processing.

Figure 9:
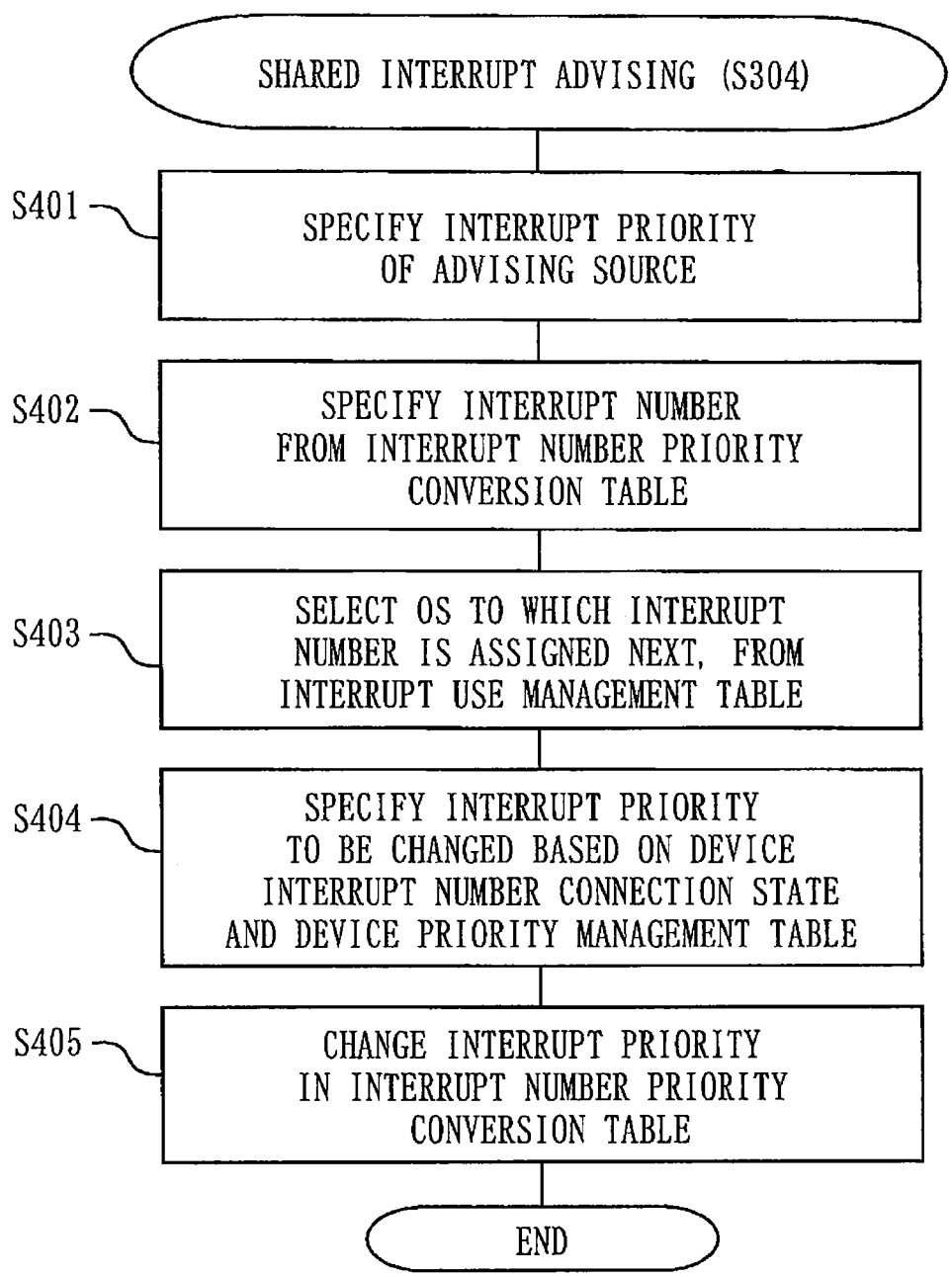
FIG. 9 is a flow chart illustrating a processing flow of a shared interrupt advice processing according to the first embodiment.

An operational procedure of the shared interrupt advising section 113 is described with reference to FIG. 9.

In S401, the shared interrupt advising section 113 specifies the interrupt priority of the requester.

In this example, the interrupt priority is processed based on the interrupt process management table A 200, and therefore the specified interrupt priority is 20.

Then, in S402, the shared interrupt advising section 113 specifies the interrupt number based on the specified interrupt priority with reference to the interrupt number priority conversion table 196. In this example, it is 16.

Then, in S403, the shared interrupt advising section 113 selects an OS to be assigned the interrupt process management table next from among candidate OSs corresponding to the interrupt number with reference to the interrupt use management table 198, and lists the selected as a use OS.

Any OS selection criteria may be applied.

In this example, from among candidate OSs corresponding to interrupt number 16, i.e., the OS-A and the OS-B, the OS-B 151 which the interrupt process management table is not assigned to is selected and listed as a use OS.

Then, in S404, the shared interrupt advising section 113 searches the device interrupt number connection table 195 and the device priority management table 197 for a device used by the OS selected in S403 from among devices sharing the interrupt number specified at S402, and specifies the interrupt priority.

In this example, when the device priority management table 197 is searched for a device used by the OS-B 151 among the device A and the device B(1) which share the interrupt number 16 in the device interrupt number connection table 195, interrupt priority 100 is found.

Then, in S405, the shared interrupt advising section 113 changes the interrupt priority in the interrupt number priority conversion table 196 in FIG. 5.

In this example, the interrupt priority corresponding to interrupt number 16 is changed to 100.

Figure 10:
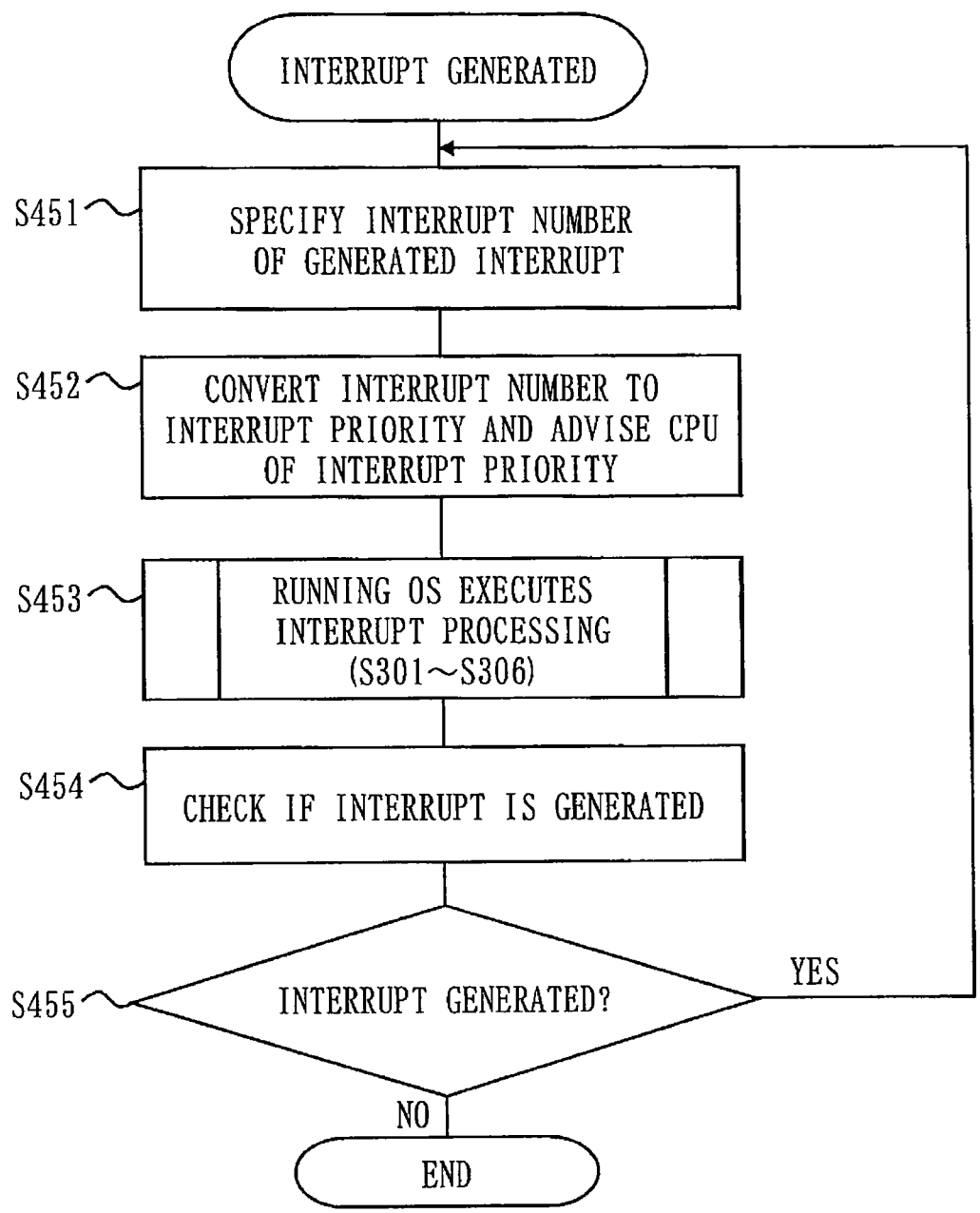
FIG. 10 is a flow chart illustrating a processing flow of the shared interrupt transmission processing to another OS according to the first embodiment.

Now, a description is given with reference to FIG. 10 of a series of operations in which the interrupt signal is generated at the device 130 to 133, and inputted to the CPU 100 via the interrupt controller 120, and subsequently the interrupt is advised to a different OS.

In the following description, a processing example is given in parentheses when an interrupt signal is generated at the device B(1) 131 while the OS-A 150 is running in CPU 100.

The interrupt controller 120, upon receipt of an interrupt signal from the device 130 to 133, specifies the interrupt number of the generated interrupt (interrupt controller 120 specifies interrupt number 16) at S451 with reference to the device interrupt number connection table 196 in the main memory 110.

Then, in S452, the interrupt controller 120 converts the interrupt number into the interrupt priority with reference to the interrupt number priority conversion table 196 in the main memory 110, and advises the CPU 100 of the interrupt priority (interrupt controller 120 advises the CPU 100 of interrupt priority 20).

Then, in S453, the interrupt processing described in S301 to S306 is performed in the CPU 100.

When the shared interrupt advising section 113 is called, the value of the interrupt number priority conversion table 196 is changed in part (after the OS-A 150 executing the interrupt processing A 170, the shared interrupt advising section 113 changes the interrupt priority corresponding to interrupt number 16 to 100 from 20 in the interrupt number priority conversion table 196).

Then, in S454, the analyzing section 111 checks if an interrupt is generated at the device 130 to 133 (interrupt from the device B (1) 131 is active unless the interrupt processing B 171 is performed by the OS-B 151, and accordingly an interrupt is generated).

Then, in S455, when no interrupt is generated at the device 130 to 133, the analyzing section 111 terminates the process.

When an interrupt is generated at the device 130 to 133, the process proceeds to S451 (since the interrupt is generated at the device B(1) 131, the process proceeds to S451).

In the following, the specific example shown in parentheses is further described.

In S451, since the interrupt is from the device B(1) 131, the interrupt controller 120 specifies the interrupt number as 16.

In S452, the interrupt controller 120 refers to the interrupt number priority conversion table 196 previously changed in S453, and therefore advises the CPU 100 of interrupt priority 100 corresponding to interrupt number 16.

In S453, through a series of operations in S301 to S306, the OS switching section 112 switches the running OS to the OS-B 151, and the OS-B 151 executes the interrupt processing B 171.

The shared interrupt advising section 113 changes the interrupt priority corresponding to interrupt number 16 back to 20 from 100 in the interrupt number priority conversion table 196.

In this circumstance where the interrupt processing B 171 is being executed, no interrupt is generated from the device B(1) 131.

In S454, the analyzing section 111 checks if an interrupt is generated at the device 130 to 133 to find that no interrupt is generated, and terminates the process at S455.

Through the processing described above, the priority of an external interrupt is changed.

In the case of an external interrupt from the device A 130, since the interrupt is cleared, the interrupt is not inputted to the interrupt controller 120 again.

In the case of an external interrupt from the device B(1) 131, since the interrupt is kept set (signal kept active), the interrupt is inputted again.

In this case, the analyzing section 111 refers to the interrupt number priority conversion table 196 to find that the interrupt priority is changed to 100, and executes the OS switching section 191, and thereby the OS-B 151 is switched to.

Once the OS is switched, the interrupt process management table A 200 is switched to the interrupt process management table B 201, thereby executing the interrupt processing B 171 corresponding to interrupt priority 100.

Thus, the interrupt signal control section compares the input interrupt priority with the interrupt priority related to the running OS, and causes the running OS to perform the interrupt processing if they match, and switches the interrupt priority to convert the interrupt number.

If they do not match, the interrupt signal control section switches the running OS.

The device continues outputting the interrupt signal corresponding to the same interrupt number until the interrupt signal is processed by the specified OS.

As a result, the interrupt signal control section can cause the specified OS of the output source device of the interrupt signal to process the interrupt signal with the third interrupt signal at the most, without fail.

This makes it always possible to cause the specified OS of an output source device of the interrupt signal to process the interrupt signal with no determination of the cause of the interrupt involved if the same interrupt number is shared by different OSs.

This also allows a response time to a specific interrupt processing to be performed at high speed.

In the foregoing description, a record corresponding to the interrupt priority inputted in the interrupt process management table for the running OS is extracted, and the processing indicated in the extracted record is performed. Alternatively, however, instead of using the interrupt process management table, the device interrupt number connection table 195 and the device priority management table 197 may be referred to to determine a next processing.

Specifically, the interrupt signal control section 11 causes the running OS to execute the interrupt processing for the interrupt signal when the interrupt priority (conversion value) obtained by converting the shared interrupt number is the same as the interrupt priority (unique value) related to the running OS in the device interrupt number connection table 195 and the device priority management table 197 (OS unique value information).

Further, the interrupt signal control section 11 lists in the interrupt number priority conversion table 196 other interrupt priorities related to the shared interrupt number in the device priority management table 197.

Further, the interrupt signal controller 11 stops the running OS and starts an OS other than the running OS as a new running OS when the interrupt priority (conversion value) obtained by converting the shared interrupt number is the same as the interrupt priority (unique value) related to the OS other than the running OS in the device interrupt number connection table 195 and the device priority management table 197 (OS unique value information).

Thus, instead of using the interrupt process management table, the device interrupt number connection table 195 and the device priority management table 197 may be used.

Embodiment 2

While the first embodiment is to change the interrupt priority in the interrupt number priority conversion table 196, a second embodiment to share the interrupt number between OSs without changing the interrupt number priority conversion table 196 is described.

As in the first embodiment, what is described as a "section" or a "means" may be a "circuit" or "equipment", or alternatively a "step" or a "procedure", in the following description.

That is, a "means" or a "processing" described below may be implemented by software, firmware, hardware, or any combination thereof.

Figure 11:
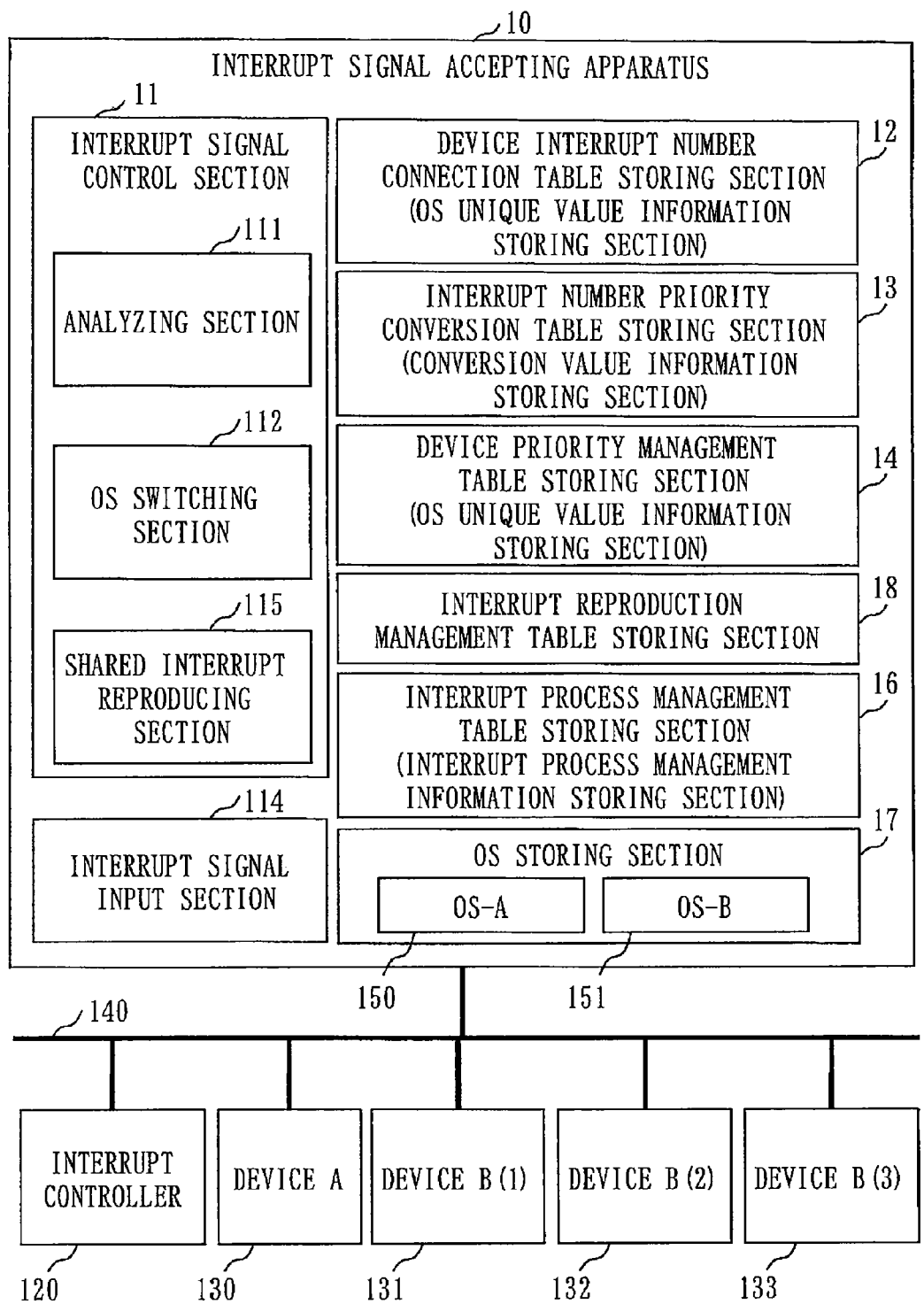
FIG. 11 shows a functional block of an interrupt signal accepting apparatus according to a second embodiment.

FIG. 11 shows a functional block of the interrupt signal accepting apparatus 10 incorporated in a multi-OS computer apparatus, which corresponds to FIG. 1.

Figure 12:
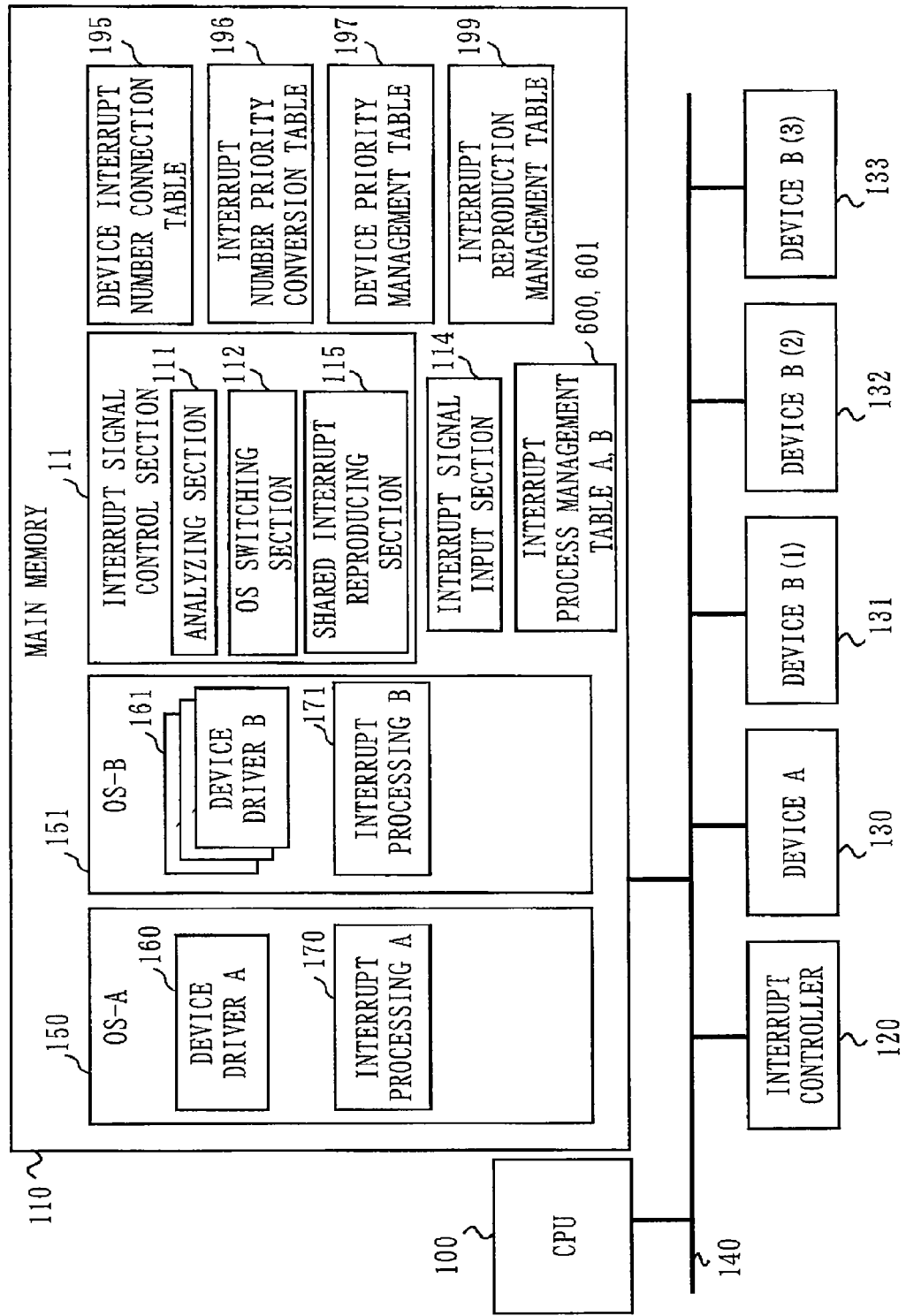
FIG. 12 show a hardware configuration example of the interrupt signal accepting apparatus according to the second embodiment.

FIG. 12 shows an example of the interrupt signal accepting device 10 in FIG. 11 implemented by the CPU 100 and the main memory 110, which corresponds to FIG. 2.

Referring to FIG. 11 and FIG. 12, a shared interrupt reproducing section 115 replaces the shared interrupt advising section 113 shown in FIG. 1 and FIG. 2.

Further, an interrupt reproduction management table storing section 18 replaces the interrupt use management table storing section 15 shown in FIG. 1 and FIG. 2, and an interrupt reproduction management table 199 replaces the interrupt use management table 198.

Further, the interrupt process management table A and the interrupt process management table B have new reference numbers 600 and 601 assigned in FIG. 12 because they are different in detail from the interrupt process management table A 200 and the interrupt process management table B 201 shown in FIG. 1 and FIG. 2.

Elements other than those described above are the same as those shown in FIG. 1 and FIG. 2, which will not be described here in detail.

The following discussion centers on differences from the first embodiment.

The interrupt reproduction management table storing section 18 is a means of storing the interrupt reproduction management table 199, and more specifically a part of the main memory 110 as shown in FIG. 2.

The interrupt reproduction management table 199 is information shown in FIG. 14, which stores interrupt number, candidate for interrupt priority (priority candidates) relating to the interrupt number, and reproduced priority which is the interrupt priority processed through reproduction processing.

Figure 13:
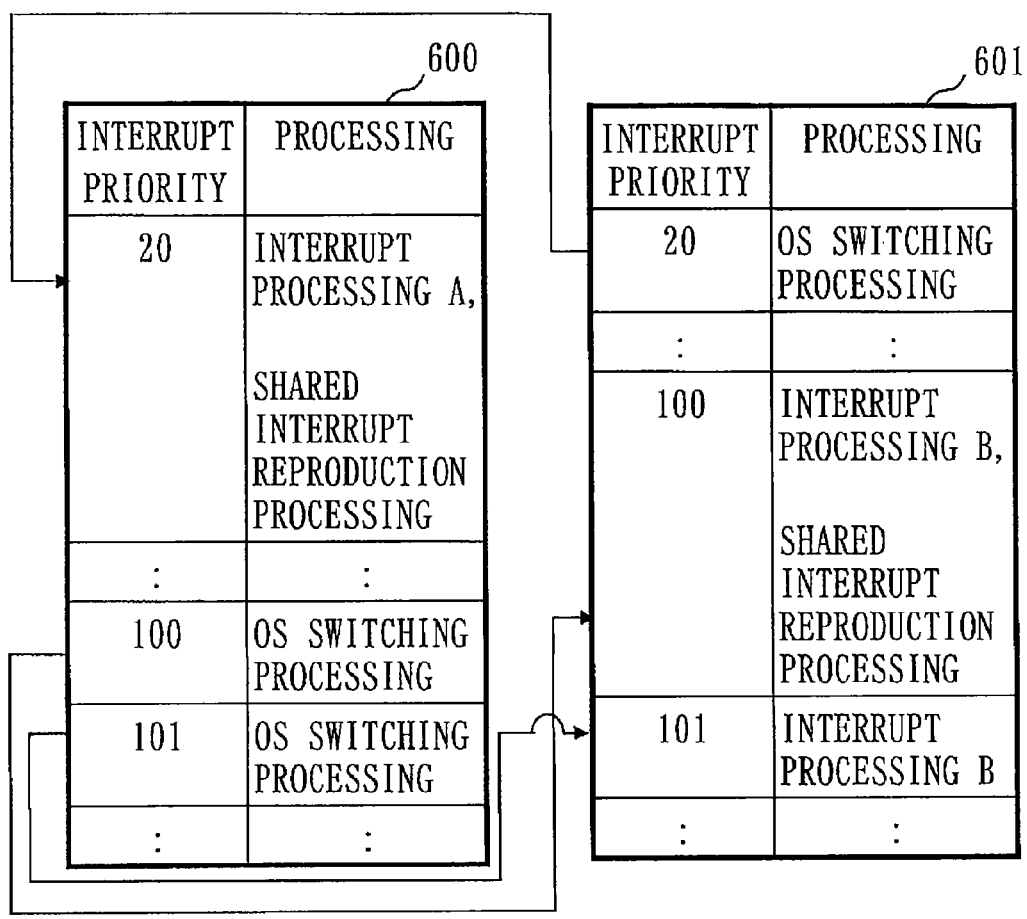
FIG. 13 shows an example of an interrupt process management table according to the second embodiment.

The interrupt process management table A 600 and the interrupt process management table B 601 are information shown in FIG. 13.

Like the interrupt process management table A 200 and the interrupt process management table B 201, one or more of the interrupt process management table A 600 and the interrupt process management table B 601 are provided for each OS.

At an OS switching, the interrupt process management table for a next OS to run is set on the CPU 100.

The interrupt process management table A 600 and the interrupt process management table B 601 define a shared interrupt reproduction processing (pseudo interrupt signal generation processing) replaces the shared interrupt advice processing defined by the interrupt process management table A 200 and the interrupt process management table B 201.

The interrupt process management table A 600 and the interrupt process management table B 601 are the same as the interrupt process management table A 200 and the interrupt process management table B 201 except for the shared interrupt reproduction processing defined in place of the shared interrupt advice processing.

In the following, a description is given of the interrupt process management table A 600, the interrupt process management table B 601, and the shared interrupt reproducing section 115, centering on the shared interrupt reproduction processing.

In the shared interrupt reproduction processing, when the interrupt priority of the interrupt signal inputted from the interrupt controller 120 is the interrupt priority corresponding to the shared interrupt number, the shared interrupt reproducing section 115 selects other interrupt priority related to the shared interrupt number in the device interrupt number connection table 195 and the device priority management table 197.

Further, the shared interrupt reproducing section 115 generates the interrupt signal notifying of the selected interrupt priority, as a pseudo interrupt signal.

The pseudo interrupt signal is not an interrupt signal actually outputted from the device 130 to 133, but a mock interrupt signal generated in the interrupt signal control section 11.

The interrupt priority notified by the pseudo interrupt signal is an example of a pseudo conversion value.

For example, when interrupt priority 20 is outputted for interrupt number 16 as the interrupt signal from the interrupt controller 120, and the current running OS is the OS-A 150, the analyzing section 111 extracts a record corresponding to interrupt priority 20 in the interrupt process management table A 600, and causes the OS-A 150 to execute the interrupt processing A in accordance with the extracted record.

Subsequently, the analyzing section 111 causes the shared interrupt reproducing section 115 to execute the shared interrupt reproduction processing.

In the shared interrupt reproduction processing, the shared interrupt reproducing section 115 generates the interrupt signal notifying of interrupt priority 100 which is other interrupt priority corresponding to interrupt number 16, as the pseudo interrupt signal.

It should be noted that the pseudo interrupt signal does not need to be outputted to the bus 140. The shared interrupt reproducing section 115 only needs to notify the interrupt signal input section 114 of interrupt priority 100.

The shared interrupt reproducing section 115 continuously generates the pseudo interrupt signal until a processing for the pseudo interrupt signal is executed by the OS.

Further, the shared interrupt reproducing section 115, upon generation of the pseudo interrupt signal, masks the interrupt signal (stops accepting the interrupt signal) corresponding to the interrupt number which the pseudo interrupt signal is pseudo of More specifically, the shared interrupt reproducing section 115 stops accepting the interrupt request with interrupt number 16.

The pseudo interrupt signal (signal indicating interrupt priority 100) from the shared interrupt reproducing section 115 is inputted to the interrupt signal input section 114.

The analyzing section 111 extracts a record corresponding to interrupt priority 100 in the interrupt process management table A 600, and causes the OS switching section 112 to switch the running OS to the OS-B 151 in accordance with the extracted record.

With a next pseudo interrupt signal from the shared interrupt reproducing section 115, the analyzing section 111 extracts a record corresponding to interrupt priority 100 in the interrupt process management table B 601, causes the OS-B 151 to execute the interrupt processing B in accordance with the extracted record, and further causes the shared interrupt reproducing section 115 to perform the shared interrupt reproduction processing.

In the shared interrupt reproduction processing at this stage, the shared interrupt reproducing section 115 removes masking against the interrupt signal, and starts accepting the interrupt signal corresponding to interrupt number 16.

In the following description, it is assumed as an example that the shared interrupt reproducing section 115 generates the pseudo interrupt signal, and the interrupt signal input section 114 receives the pseudo interrupt signal from the shared interrupt reproducing section 115. Alternatively, however, the shared interrupt reproducing section 115 may notify the interrupt controller 120 of the interrupt priority notified by the pseudo interrupt signal, and also instruct the interrupt controller 120 to output the pseudo interrupt signal, for example.

In this case, the interrupt controller 120 also continuously outputs the pseudo signal corresponding to the same interrupt priority until an OS processing is performed for the pseudo interrupt signal.

Figure 15:
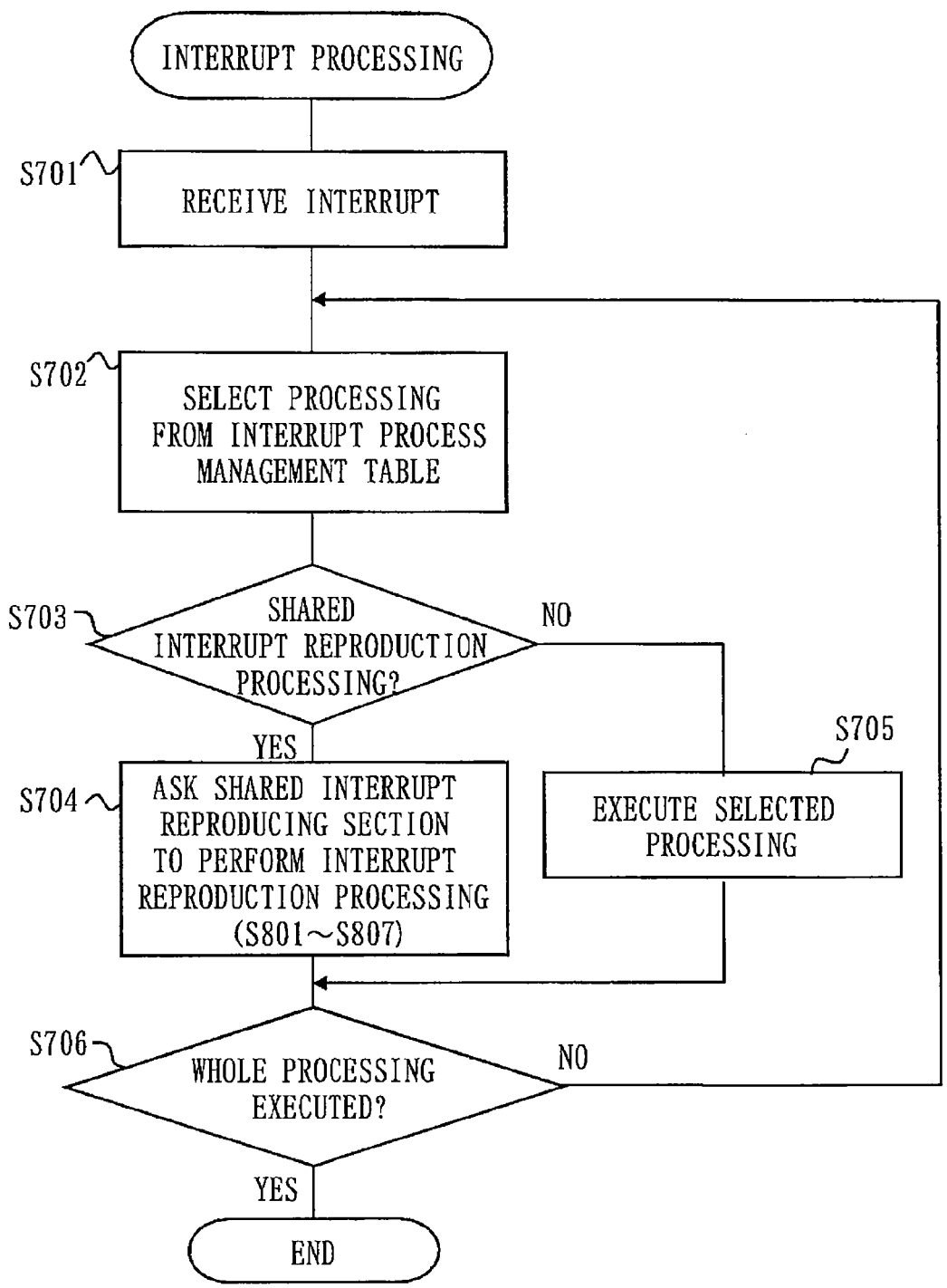
FIG. 15 is a flow chart illustrating a processing flow upon generation of an interrupt according to the second embodiment.

Now, a description is given with reference to FIG. 15 of an operation performed when the interrupt signal is inputted to the CPU 100 via the bus 140.

It should be noted that S701 corresponding to S301, S702 corresponding to S302, S705 corresponding to S305, and S706 corresponding to S306 will not be described here in detail.

In S703, if the processing selected at S702 is the shared interrupt reproduction processing, the analyzing section 111 moves the process to S704.

If not the shared interrupt preproduction processing, the process is moved to S705.

Here, assuming that the selected processing is the shared interrupt reproduction processing, the process proceeds to S704.

Then, in S704, the analyzing section 111 requests the shared interrupt reproducing section 115 for the shared interrupt reproduction processing.

More specifically, the analyzing section 111 advises the shared interrupt reproducing section 115 of the interrupt priority in process, asking for the shared interrupt reproduction processing.

Here, it is assumed that interrupt priority 20 is advised.

Figure 16:
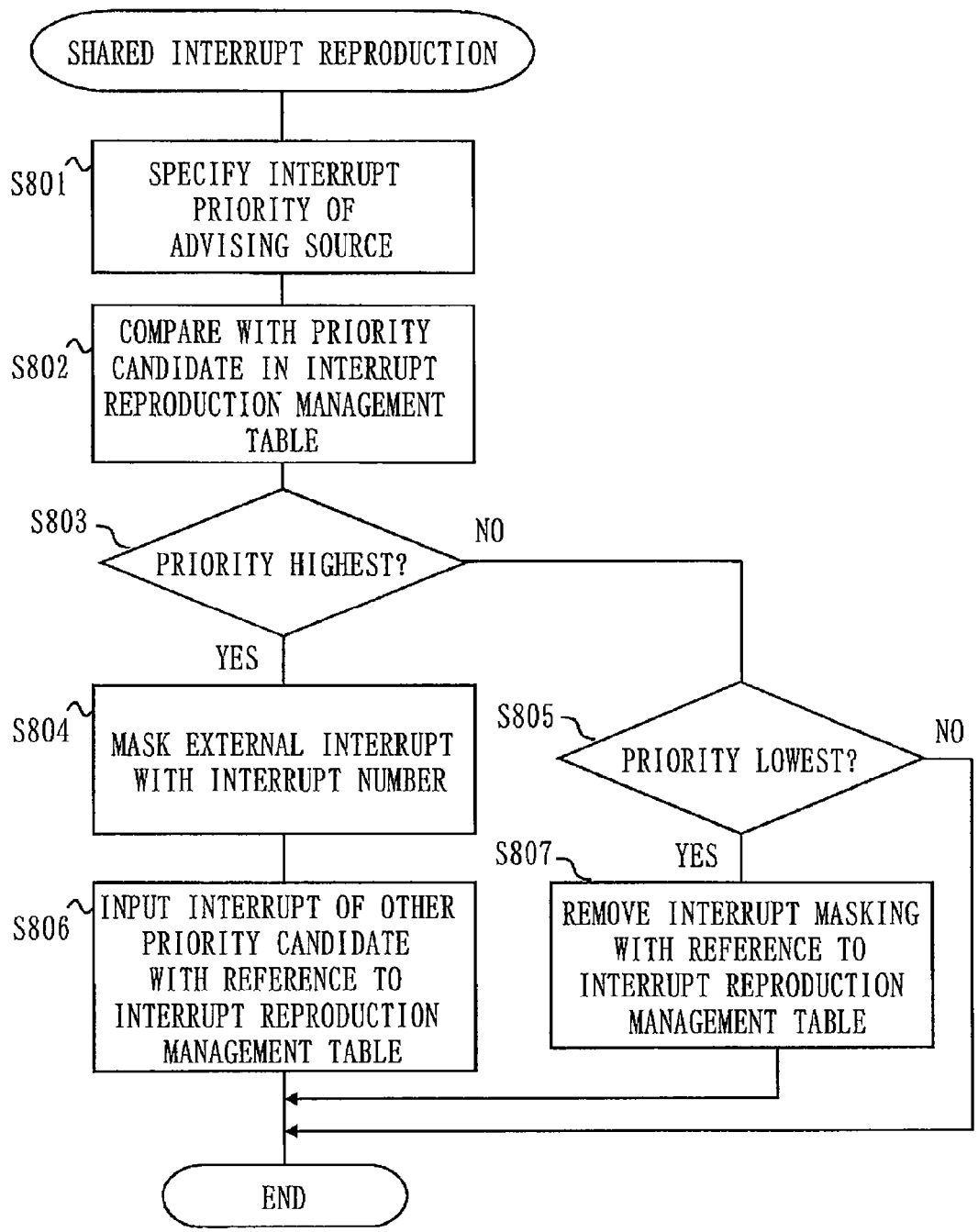
FIG. 16 is a flow chart illustrating a processing flow of the shared interrupt reproduction processing according to the second embodiment.

Now, a description is given with reference to FIG. 16 of an operation of the shared interrupt reproducing section 115.

In S801, the shared interrupt reproducing section 115 specifies the interrupt priority of the requester.

In this example, the processing indicated by the record corresponding to interrupt priority 20 in the interrupt process management table A 600 is in process, and the specified interrupt priority is 20.

Then, in S802, the shared interrupt reproducing section 115 searches the interrupt reproduction management table 199 for priority candidates sharing the same interrupt number, based on the specified interrupt priority, and compares the priority candidates with the specified interrupt priority.

In this example, the interrupt priority is 20, which is the highest priority in comparison between interrupt priority 20 and interrupt priority 100.

Here, interrupt priority 100 assigned to interrupt number 16 along with interrupt priority 20 is extracted with reference to the interrupt reproduction management table 199. This is, however, equivalent to extracting interrupt priority 100 assigned to interrupt number 16 along with interrupt priority 20 with reference to the device interrupt number connection table 195 and the device priority management table 197.

Therefore, instead of referring to the interrupt reproduction management table 199, interrupt priority 100 may be derived with reference to the device interrupt number connection table 195 and the device priority management table 197.

Then, in S803, if the interrupt priority specified at S801 is the highest priority among priority candidates in comparison, the shared interrupt reproducing section 115 moves the process to S804.

If the interrupt priority specified at S801 is not the highest priority, then the shared interrupt reproducing section 115 moves the process to S805.

In this example, interrupt priority 20 specified at S801 is the highest priority, and therefore the process is moved to S804.

Then, in S804, the shared interrupt reproducing section 115 specifies the interrupt number with reference to the interrupt reproduction management table 199 based on the interrupt priority specified at S801, and masks external interrupts with that interrupt number.

External interrupt masking may be performed by using a CPU 100 function, or an interrupt controller 120 function.

In this example, an interrupt with interrupt number 16 is masked (i.e., to stop accepting the interrupt signal notifying of interrupt number 16).

Then, in S806, the shared interrupt reproducing section 115 searches the interrupt reproduction management table 199 for priority candidates sharing the same interrupt number, based on the specified interrupt priority, and generates the pseudo interrupt signal to notify of the priority candidates. The generated pseudo interrupt signal is received at the interrupt signal input section 114.

For example, when there are three levels of the interrupt priority, 20, 50 and 100 corresponding to interrupt number 16, the shared interrupt reproducing section 115 generates the pseudo interrupt signal notifying of interrupt priority 50 and the pseudo interrupt signal notifying of interrupt priority 100.

In this case, the shared interrupt reproducing section 115 inputs only the pseudo interrupt signal notifying of interrupt priority 50, which is higher in priority, to the interrupt signal input section 114. Then, after the pseudo interrupt signal notifying of interrupt priority 50 is handled through the interrupt processing by the OS, the pseudo interrupt signal notifying of interrupt priority 100 is inputted to the interrupt signal input section 114.

Further, instead of the method of generating the pseudo interrupt signal in the shared interrupt reproducing section 115, the shared interrupt reproducing section 115 may instruct the interrupt controller 120 to generate the pseudo interrupt signal, and the interrupt signal input section 114 may receive the pseudo interrupt signal from the interrupt controller 120, as described above.

In the following, a description is given of an example where the shared interrupt reproducing section 115 generates the pseudo interrupt signal notifying of interrupt priority 100 which is then inputted to the interrupt signal input section 114.

The pseudo interrupt signal inputted to the interrupt signal input section 114 is processed through S701 to S706 shown in FIG. 15 in a similar manner to that for a regular interrupt signal.

When the pseudo interrupt signal is to be processed through the shared interrupt reproduction processing (YES at S703), the pseudo interrupt signal is processed through the processing shown in FIG. 16.

In the following, a description is given of operations at S805 and S807, assuming that the specified priority is 100 at S801.

More specifically, the shared interrupt reproduction processing is executed with the pseudo interrupt signal notifying of interrupt priority 100, and the shared interrupt reproducing section 115 specifies interrupt priority 100 (S801), and compares the specified interrupt priority with other interrupt priority assigned to the same interrupt number, with reference to the interrupt reproduction management table 199 (S802), and the following processing is described below.

In S805, if it is the lowest priority (NO at S803, YES at S805) as a result of the comparison at S802, the shared interrupt reproducing section 115 moves the process to S807.

If it is not a low priority, the shared interrupt reproducing section 115 terminates the shared reproduction processing.

In this example, the interrupt priority is 100 which is the lowest priority in comparison between interrupt priority 20 and interrupt priority 100, and therefore the process is moved to S807.

Then, in S807, the interrupt number is specified with reference to the interrupt reproduction management table 199 based on the interrupt priority specified at S801, and external interrupt masking against that interrupt number is removed.

When this processing is performed, since all the processings for the interrupt priorities assigned to the same interrupt number are completed, all the causes to ban an interrupt are cleared, and therefore the removal of the interrupt masking causes no problem.

In this example, the external interrupt masking against interrupt number 16 is removed.

Figure 17:
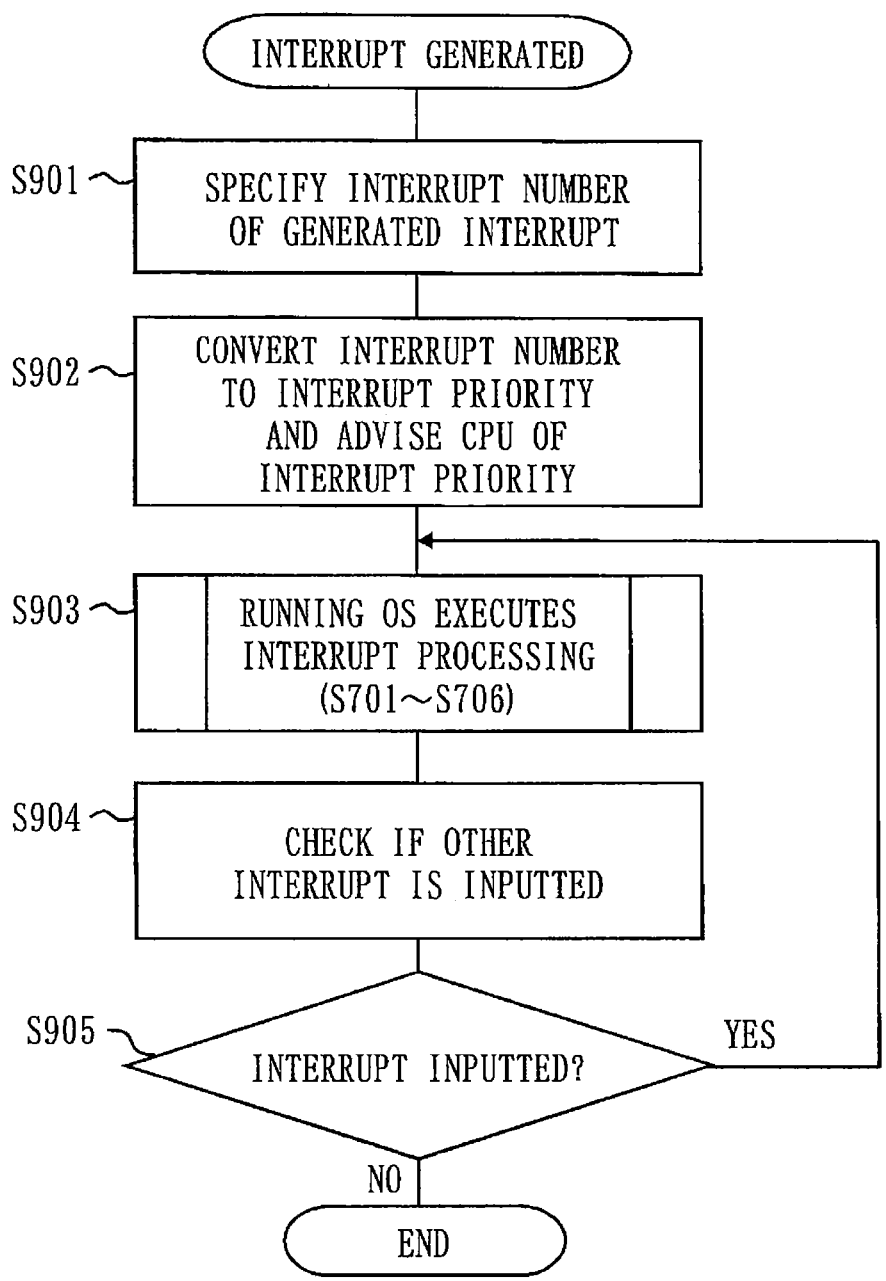
FIG. 17 is a flow chart illustrating a processing flow upon generation of an interrupt according to the second embodiment.

Now, a description is given with reference to FIG. 17 of a series of operations in which the interrupt signal is generated at the device 130 to 133, and inputted to the CPU 100 via the interrupt controller 120, and then the interrupt is advised to a different OS.

In the following description, a processing example is given in parentheses when the interrupt signal is generated at the device B(1) 131 while the OS-A 150 is running in CPU 100.

In S901, the interrupt controller 120, upon receipt of the interrupt signal from the device 130 to 133, specifies the interrupt number of the generated interrupt, with reference to the device interrupt number connection table 195 in the main memory 110 (interrupt controller 120 specifies interrupt number 16).

Then, in S902, the interrupt controller 120 converts the interrupt number into the interrupt priority with reference to the interrupt number priority conversion table 196 in the main memory 110, and advises the CPU 100 of the interrupt priority (interrupt controller 120 advises the CPI 100 of interrupt priority 20).

Then, in S903, the interrupt processing described with reference to S701 to S706 is performed in the CPU 100.

When the shared interrupt reproducing section 115 is called, the external interrupt of the interrupt number is masked by the shared interrupt reproducing section 115, and the pseudo interrupt notifying of a different priority candidate is inputted to the interrupt signal input section 114, as was described earlier (the interrupt signal corresponding to interrupt number 16 is masked, the pseudo interrupt signal corresponding to interrupt priority 100 is generated by the shared interrupt reproducing section 115, and inputted to the interrupt signal input section 114. Referring to the previously inputted interrupt priority 20, it is processed through the interrupt processing A 170).

Then, in S904, the analyzing section 111 checks if other interrupt priority is inputted in the interrupt signal input section 114 (in this example, since the pseudo interrupt signal corresponding to interrupt priority 100 added at S903 is inputted, there is other interrupt priority inputted as a result).

Then, in S905, if there is no other interrupt priority inputted, the analyzing section 111 terminates the process.

If there is other interrupt priority inputted, the analyzing section 111 moves the process to S903 (in this example, since interrupt priority 100 is inputted, the process is moved to S903).

In the following, the specific example shown in parentheses is further described.

In S903, the OS switching section 112 switches the running OS to the OS-B 151 through the processing at S701 to S706, and the interrupt processing B 171 is executed by the OS-B 151.

In the processing at S704 after the interrupt processing B 171 is executed, the shared interrupt reproducing section 115 determines that interrupt priority 100 is the lowest priority (YES at S805). As a result, the interrupt masking against interrupt number 16 is cleared.

The clearing of interrupt masking against interrupt number 16 results in that the interrupt signal corresponding to interrupt priority 20 is inputted to the CPU 100 upon generation of the interrupt signal corresponding to interrupt number 16.

In S904, the analyzing section 111 checks if there is other interrupt priority inputted in the interrupt signal input section 114 to find that there is no other interrupt priority inputted, which terminates the process at S905.

In the foregoing description, the shared interrupt reproducing section 115 generates the pseudo interrupt signal corresponding to other interrupt priority in S806. Alternatively, however, the pseudo interrupt signal corresponding to other interrupt priority (interrupt priority 100 in this example) may be inputted to the interrupt signal input section 114 from the interrupt controller 120, in S902.

More specifically, inputs of interrupt priorities by the shared interrupt reproducing section 115 in S806 are omitted.

Through the processing described above, interrupt priority 20 is outputted from the interrupt controller 120 as the interrupt signal corresponding to interrupt number 16, for example. When the current running OS is the OS-A 150, the analyzing section 111 extracts a record corresponding to interrupt priority 20 in the interrupt process management table A 600, and causes the OS-A-150 to execute the interrupt processing A in accordance with the extracted record.

Subsequently, the analyzing section 111 causes the shared interrupt reproducing section 115 to execute the shared interrupt reproduction processing.

In the shared interrupt reproduction processing, the shared interrupt reproducing section 115 generates interrupt priority 100 which is other interrupt priority corresponding to interrupt number 16, as the pseudo interrupt signal.

The analyzing section 111, upon receipt of the pseudo interrupt signal, extracts a record corresponding to interrupt priority 100 in the interrupt process management table A600, and causes the OS switching section 112 to switch the running OS to the OS-B 151 in accordance with the extracted record.

With a next pseudo interrupt signal (interrupt priority 100) from the shared interrupt reproducing section 115, the analyzing section 111 extracts a record corresponding to interrupt priority 100 in the interrupt process management table B 601, and causes the OS-B 151 to execute the interrupt processing B in accordance with the extracted record.

Thus, the interrupt signal is processed by the specified OS whether the output source of the interrupt signal corresponding to interrupt number 16 is the device A 130 or the device B(1) 131.

Further, the analyzing section 111 causes the shared interrupt reproducing section 115 to implement the shared interrupt reproduction processing.

In this shared interrupt reproduction processing, the shared interrupt reproducing section 115 removes the masking against the interrupt signal corresponding to interrupt number 16, and restarts accepting the interrupt signals corresponding to interrupt number 16.

Thus, according to this embodiment, the interrupt masking and the inputting of an interrupt with other priority to the CPU from another CPU or the interrupt controller enable each OS to occupy a device if there is another device sharing the same interrupt number.

Lastly, a description is given of a hardware configuration of a computer apparatus 1 which includes the interrupt signal accepting apparatus 10 described in the first and second embodiments.

Figure 18:
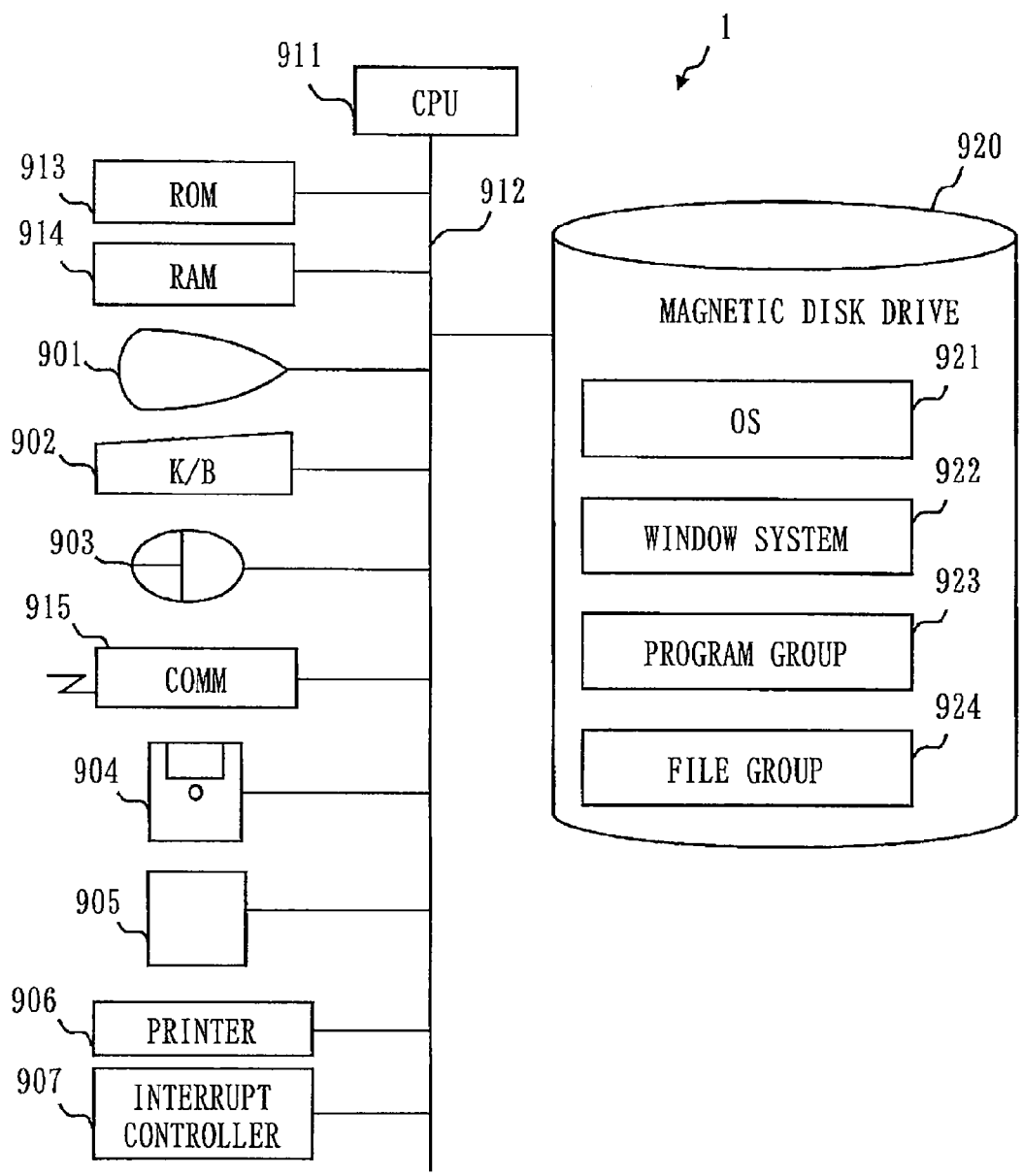
FIG. 18 shows a hardware configuration example of a computer apparatus including the interrupt signal accepting apparatus according to the first and second embodiments.

FIG. 18 shows an example of the hardware resources of the computer apparatus 1 including the interrupt signal accepting apparatus 10 described in the first and second embodiments.

It should be noted that the FIG. 18 configuration only shows an example of the hardware configuration of the computer apparatus 1. Therefore, the hardware configuration of the computer apparatus 1 is not limited to the FIG. 18 configuration, and may be replaced by a different configuration.

Referring to FIG. 18, the computer apparatus 1 includes a CPU 911 (referred to also as a central processing unit, a central processor, a processing unit, an arithmetic unit, a microprocessor, a microcomputer, or a processor) to execute programs.

The CPU 911 is connected via a bus 912 to a read only memory (ROM) 913, a random access memory (RAM) 914, a communication board 915, a display unit 901, a keyboard 902, a mouse 903 and a magnetic disk drive 920, and controls those hardware devices.

The CPU 911 is also connected to an interrupt controller 907.

The CPU 911 may be further connected to a flexible disk drive 904 (FDD), a compact disk drive 905 (CDD) and a printer 906.

The magnetic disk drive 920 may be replaced by a storage unit such as a solid state drive (SSD), an optical disk drive, or a memory card (registered trademark) read/write drive.

The RAM 914 is an example of a volatile memory.

The storage media of the ROM 913, the FDD 904, the CDD 905, and the magnetic disk drive 920 are examples of non-volatile memories. These are examples of storage apparatuses.

The CPU 911 corresponds to the CPU 100 described in the first and second embodiments. The RAM 914 corresponds to the main memory 110 described in the first and second embodiments.

The interrupt controller 907 corresponds to the interrupt controller 120 described in the first and second embodiments.

The other hardware resources correspond to the devices 130 to 133 described in the first and second embodiments.

The communication board 915, the keyboard 902, the mouse 903, the interrupt controller 907, the FDD 904 and the like are examples of input units.

The communication board 915, the display unit 901, the printer 906 and the like are examples of output units.

The communication board 915 may be connected, for example, to a local area network (LAN), the Internet, a wide area network (WAN), a storage area network (SAN) or the like.

The magnetic disk drive 920 stores an operating system 921 (OS), a window system 922, a program group 923, and a file group 924.

As described in the first and second embodiments, two or more of the operating systems 921 (OS), corresponding to the OS-A 150 and the OS-B 151, run on the computer apparatus 1.

Programs in the program group 923 are executed by the CPU using the operating system 921 and the window system 922.

The program group 923 includes programs to implement the functions of the internal elements of the interrupt signal control section 11 and the interrupt signal input section 114 in the first and second embodiments. Those programs are loaded into the RAM 914 and executed by the CPU 911.

The RAM 914 stores temporarily at least a part of programs of the operating system 921 and application programs to be executed by the CPU 911.

The RAM 914 also stores various kinds of data needed for CPU 911 processing.

The ROM 913 stores basic input/output system (BIOS) programs. The magnetic disk drive 920 stores boot programs.

At the start of the computer apparatus 1, the BIOS programs in the ROM 913 and the boot programs in the magnetic disk drive 920 are executed to activate the operating systems 921.

The file group 924 stores as a "file" item or a "database" item, information, data, a signal value, a variable value or a parameter that indicates a processing result of "determination", "extraction", "comparison", "specification", "updating", "setup", "registration", "selection", "inputting", "outputting" or the like described in the first and second embodiments.

"Files" and "databases" are stored in a storage medium such as a disk or a memory.

Information, data, a signal value, a variable value or a parameter stored in the storage medium such as a disk or a memory is retrieved into a main memory or a cache memory by the CPU 911 via a read/write circuit.

Retrieved information or data, or a retrieved signal value, variable value, or parameter is used in a CPU operation for extraction, retrieval, reference, comparison, computation, calculation, processing, editing, outputting, printing, displaying or the like.

During a CPU operation for extraction, retrieval, reference, comparison, computation, calculation, processing, editing, outputting, printing or displaying, information, data, a signal value, a variable value or a parameter is stored temporarily in a main memory, a register, a cache memory, a buffer memory or the like.

Arrows shown in the flow charts described in the first and second embodiments mainly indicate the input/output of data or a signal.

Data or a signal value is recorded in a record medium such as a memory in the RAM 914, a flexible disk in the FDD 904, a compact disk in the CDD 905, or a magnetic disk in the magnetic disk drive 920, or other record medium such as an optical disk, a minidisk, a DVD or the like.

Data or a signal is transmitted online via the bus 912, a signal line, a cable, or other transmission medium.

The operation of the interrupt signal accepting apparatus 10 shown in the first and second embodiments may be interpreted as a method from the steps, procedures, and processing shown in the flow charts described in the first and second embodiments.

Any element described as a "section" may be implemented by firmware stored in the ROM 913.

Alternatively, it may be implemented solely by software; or solely by hardware such as an element, a device, a board, wiring or the like; or by a combination of software and hardware; or by a combination with firmware further added thereto.

Firmware and software are stored as a program in a record medium such as a magnetic disk, a flexible disk, an optical disk, a compact disk, a mini disk, a DVD or the like.

A program is retrieved and executed by the CPU 911.

In other words, a program causes the computer apparatus 1 to function as a "section" described in the first and second embodiments, or causes the computer apparatus 1 to execute the procedure or method of a "section" described in the first and second embodiments.

REFERENCE SIGNS LIST 10 interrupt signal accepting apparatus
11 interrupt signal control section
12 device interrupt number connection table storing section
13 interrupt number priority conversion table storing section
14 device priority management table storing section
15 interrupt use management table storing section
16 interrupt process management table storing section
17 OS storing section
18 interrupt reproduction management table storing section
100 CPU
110 main memory
111 analyzing section
112 OS switching section
113 shared interrupt advising section
114 interrupt signal input section
115 shared interrupt reproducing section
120 interrupt controller
130 device A
131 device B(1)
132 device B(2)
133 device B(3)
140 bus
150 OS-A
151 OS-B
160 device driver A
161 device driver B
170 interrupt processing A
171 interrupt processing B
195 device interrupt number connection table
196 interrupt number priority conversion table
197 device priority management table
198 interrupt use management table
199 interrupt reproduction management table
200 interrupt process management table A
201 interrupt process management table B
600 interrupt process management table A
601 interrupt process management table B

The invention claimed is:

1. An interrupt signal accepting apparatus, managing operations of at least two operating systems (OSs) and accepting interrupt signals from a plurality of devices, wherein an interrupt number notified by an interrupt signal and an OS caused to process the interrupt signal as a specified OS are specified to each of the plurality of devices, the interrupt signal accepting apparatus comprising:
processing circuitry configured to performs as an OS unique value information storing section that stores OS unique value information to relate each of at least two number sharing devices which share the same interrupt number, to the specified OS of each number sharing device, a unique value which is unique to each number sharing device, and a shared interrupt number which is shared by the at least two number sharing devices;
the processing circuitry further configured to perform as a conversion value information storing section that stores conversion value information to specify a unique value selected from among at least two unique values related to the shared interrupt number in the OS unique value information as a conversion value of the shared interrupt number, for each shared interrupt number; and
the processing circuitry further configured to perform as an interrupt signal control section that:
when the interrupt signal notifying of the shared interrupt number is outputted while one of the OSs is running as a running OS,
causes the running OS to execute a processing for the interrupt signal, the running OS being related in the OS unique value information to the unique value which is the same as the conversion value obtained by converting the shared interrupt number notified by the interrupt signal in accordance with conversion value information,
changes the conversion value information, and
causes an OS other than the running OS to start as a new running OS and the running OS to stop, the OS other than the running OS being related in the OS unique value information to the unique value which is the same as the conversion value obtained by converting the shared interrupt number in accordance with the changed conversion value information.

2. The interrupt signal accepting apparatus according to claim 1,
wherein the interrupt signal control section,
when the interrupt signal notifying of the shared interrupt number is outputted after the new running OS is started,
causes the new running OS to execute the processing for the interrupt signal, the new running OS being related in the OS unique value information to the unique value which is the same as the conversion value obtained by converting the shared interrupt number notified by the interrupt signal in accordance with the changed conversion value information,
changes the changed conversion value information, and
causes one of the OSs other than the new running OS to start as the next new running OS and the new running OS to stop, the one of the OSs being related in the OS unique value information to the unique value which is the same as the conversion value obtained by converting the shared interrupt number in accordance with lastly changed conversion value information.

3. The interrupt signal accepting apparatus according to claim 1, connected to an interrupt controller which inputs the interrupt signal notifying of the interrupt number outputted from each device, refers to the conversion value information, if the interrupt number of the interrupt signal inputted is the shared interrupt number, converts the shared interrupt number into the conversion value specified in the conversion value information, and outputs the interrupt signal notifying of the conversion value,
the processing circuitry is further configured to perform as an interrupt signal input section that inputs from the interrupt controller the interrupt signal notifying of the conversion value,
wherein the interrupt signal control section causes the running OS to process the interrupt signal if the conversion value notified by the interrupt signal inputted by the interrupt signal input section is the same as the unique value related to the running OS in the OS unique value information.

4. The interrupt signal accepting apparatus according to claim 1, wherein:
the processing circuitry is further configured to perform as an interrupt process management information storing section that stores interrupt process management information that defines for each OS an interrupt processing for the unique value related to each OS in the OS unique value information, and an OS switching processing for the unique value related to another OS in the OS unique value information, wherein the interrupt signal control section:
when the interrupt signal notifying of the shared interrupt number is outputted,
retrieves the interrupt process management information for the running OS from the interrupt process management information storing section, and extracts from the interrupt process management information for the running OS the same unique value as the conversion value obtained by converting the shared interrupt number notified by the interrupt signal in accordance with the conversion value information;
causes the running OS to execute the processing for the interrupt signal if the interrupt processing for an extracted unique value is defined; and
causes the running OS to stop, and the OS other than the running OS to start as the new running OS if the OS switching processing is defined for the extracted unique value.

5. The interrupt signal accepting apparatus according to claim 1,
wherein the interrupt signal control section:
when the conversion value obtained by converting the shared interrupt number notified by the interrupt signal is the same as the unique value related to the running OS,
selects another unique value related to the shared interrupt number in the OS unique value information as a pseudo conversion value, and
generates a pseudo interrupt signal that notifies of a selected pseudo conversion value;
the processing circuitry is further configured to perform as an interrupt signal input section that inputs the pseudo interrupt signal notifying of the pseudo conversion value generated by the interrupt signal control section,
wherein the interrupt signal control section:
causes the running OS to execute the processing for the pseudo interrupt signal if the pseudo conversion value notified by the pseudo interrupt signal inputted by the interrupt signal input section is the same as the unique value related to the running OS which is in operation when the pseudo interrupt signal is inputted, and
causes the running OS to stop and one of the OSs other than the running OS to start as the new running OS if the pseudo conversion value notified by the pseudo interrupt signal inputted by the interrupt signal input section is the same as the unique value related to an OS other than the running OS which is in operation when the pseudo interrupt signal is inputted.

6. The interrupt signal accepting apparatus according to claim 1, connected to an interrupt controller which inputs the interrupt signal notifying of the interrupt number outputted from each device, refers to the conversion value information, if the interrupt number of the interrupt signal inputted is the shared interrupt number, converts the shared interrupt number into the conversion value specified in the conversion value information, and outputs the interrupt signal notifying of the conversion value,
the processing circuitry is further configured to perform as an interrupt signal input section that inputs the interrupt signal notifying of the conversion value from the interrupt controller, wherein:
the interrupt signal control section,
when the conversion value notified by the interrupt signal from the interrupt controller is the same as the unique value related to the running OS,
selects another unique value related to the shared interrupt number in the OS unique value information, as the pseudo conversion value, and
instructs the interrupt controller to output the pseudo interrupt signal notifying of the selected pseudo conversion value;
the interrupt signal input section inputs the pseudo interrupt signal notifying of the pseudo conversion value from the interrupt controller; and
the interrupt signal control section that:
causes the running OS to execute the processing for the pseudo interrupt signal if the pseudo conversion value notified by the pseudo interrupt signal inputted by the interrupt signal input section is the same as the unique value related to the running OS which is in operation when the pseudo interrupt signal is inputted; and
causes the running OS to stop and one of the OSs other than the running OS to start if the pseudo conversion value notified by the pseudo interrupt signal inputted by the interrupt signal input section is the same as the unique value related to an OS other than the running OS which is in operation when the pseudo interrupt signal is inputted.

7. A computer apparatus including the interrupt signal accepting apparatus according to claim 1.

8. The interrupt signal accepting apparatus according to claim 4, wherein:
the interrupt process management information storing section stores the interrupt process management information that defines for each OS the interrupt processing and an update processing of the conversion value information for the unique value related to each OS in the OS unique value information; and
the interrupt signal control section:
when the interrupt signal notifying of the shared interrupt number is outputted,
retrieves the interrupt process management information for the running OS from the interrupt process management information storing section,
extracts from the interrupt process management information for the running OS the same unique value as the conversion value obtained by converting the shared interrupt number notified by the interrupt signal in accordance with the conversion value information,
causes the running OS to execute the processing for the interrupt signal if the interrupt processing and the update processing of the conversion value information are defined for the extracted unique value, and
selects another unique value related to the shared interrupt number in the OS unique value information, and updates the conversion value information so that the selected unique value is specified as the new conversion value of the shared interrupt number, as the update processing of the conversion value information.

9. The interrupt signal accepting apparatus according to claim 5, wherein the interrupt signal control section generates the pseudo interrupt signal notifying of the same pseudo conversion value continuously until the pseudo interrupt signal is processed by the specified OS.

10. The interrupt signal accepting apparatus according to claim 5, wherein:
the processing circuitry is further configured to perform as an interrupt process management information storing section that stores the interrupt process management information that defines for each OS the interrupt processing and a generation processing of the pseudo interrupt signal for the unique value related to each OS in the OS unique value information, and the OS switching processing for the unique value related to another OS in the OS unique value information;
wherein the interrupt signal control section:
when the interrupt signal notifying of the shared interrupt number is outputted,
retrieves the interrupt process management information for the running OS from the interrupt process management information storing section; and
extracts the same unique value as the conversion value obtained by converting the shared interrupt signal notified by the interrupt signal in accordance with the conversion value information from the interrupt process management information for the running OS;
when the interrupt processing and the generation processing of the pseudo interrupt signal is defined for the extracted unique value,
causes the running OS to execute the processing for the interrupt signal,
selects another unique value related to the shared interrupt number in the OS unique value information as the pseudo conversion value, as the generation processing of the pseudo interrupt signal, and
generates the pseudo interrupt signal notifying of the selected pseudo conversion value; and
when the OS switching processing is defined for the extracted unique value,
causes the running OS to stop and one of the OSs other than the running OS to start as a new running OS.

11. The interrupt signal accepting apparatus according to claim 5, configured to accept interrupt signals from the plurality of devices each continuously outputting the interrupt signal notifying of the same interrupt number until the interrupt signal is processed by the specified OS,
wherein the interrupt signal control section:
selects the pseudo conversion value;
specifies the shared interrupt number notified by the interrupt signal as an acceptance stop number, and stops accepting the interrupt signal notifying of the acceptance stop number; and
when the processing of the pseudo interrupt signal is completed by the specified OS;
removes the specification of the acceptance stop number and resumes accepting the interrupt signal notifying of the shared interrupt number.

12. The interrupt signal accepting apparatus according to claim 6, connected to the interrupt controller continuously outputting the pseudo interrupt signal notifying of the same pseudo conversion value until the pseudo interrupt signal is processed by the specified OS.

13. The interrupt signal accepting apparatus according to claim 6, wherein:
the processing circuitry is further configured to perform as an interrupt process management information storing section that stores the interrupt process management information that defines for each OS the interrupt processing and the generation processing of the pseudo interrupt signal for the unique value related to each OS in the OS unique value information, and the OS switching processing for the unique value related to another OS in the OS unique value information,
wherein the interrupt signal control section:
when the interrupt signal notifying of the shared interrupt number is outputted,
retrieves the interrupt process management information for the running OS from the interrupt process management information storing section, and
extracts from the interrupt process management information for the running OS the same unique value as the conversion value obtained by converting the shared interrupt number notified by the interrupt signal in accordance with the conversion value information;
when the interrupt processing and the generation processing of the pseudo interrupt signal are defined for the extracted unique value,
causes the running OS to execute the processing for the interrupt signal,
selects another unique value related to the shared interrupt number in the OS unique value information, as the pseudo conversion value, and instructs the interrupt controller to output the pseudo interrupt signal notifying of the selected pseudo conversion value, as the generation processing of the pseudo interrupt signal; and
when the OS switching processing is defined for the extracted unique value,
cause the running OS to stop and an OS other than the running OS to start as a new running OS.

* * * * *